Figure 5:
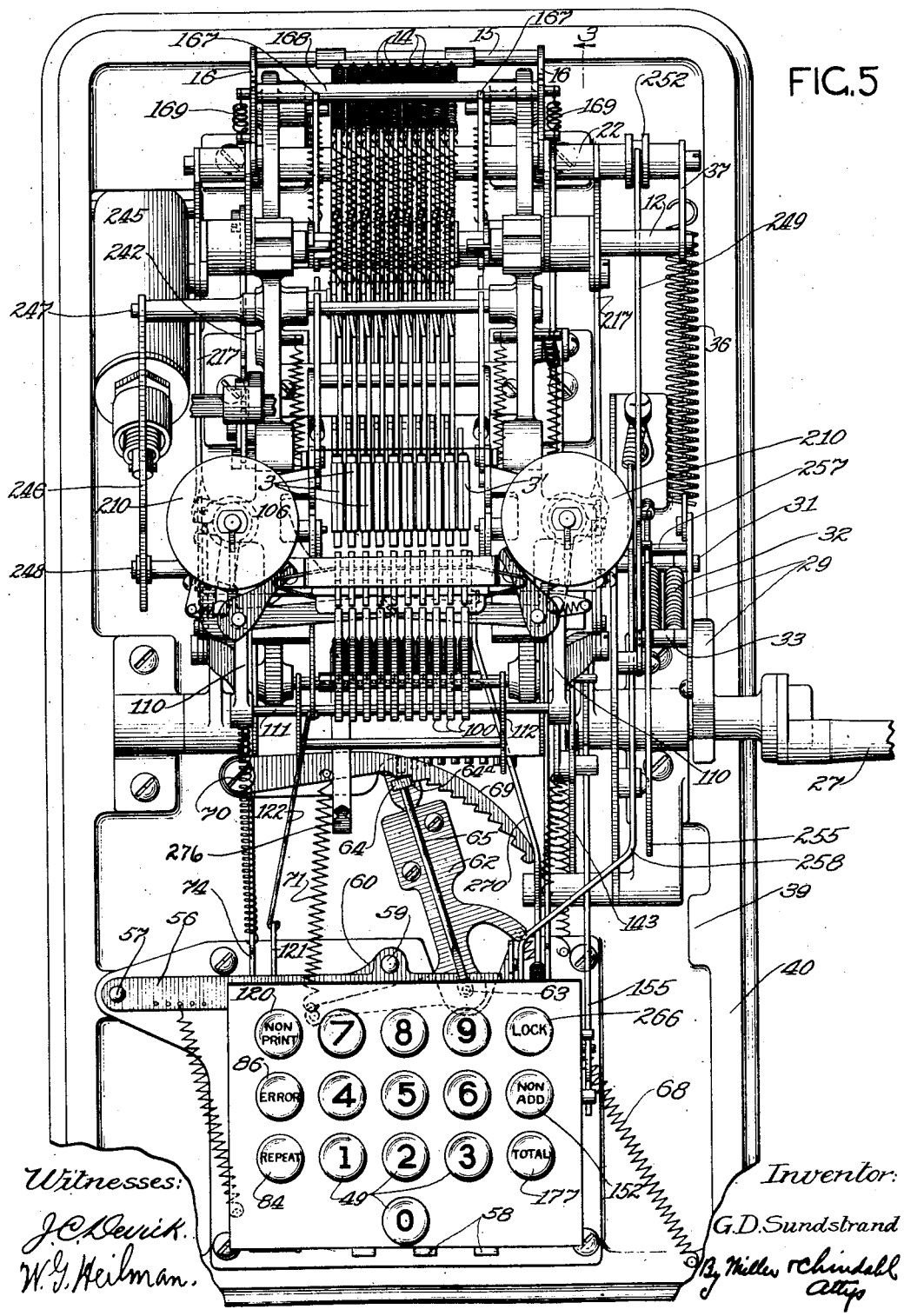

G. D. SUNDSTRAND.
ADDING AND LISTING MACHINE.
APPLICATION FILED MAR. 14, 1914.
1,198,487.
Patented Sept. 19, 1916.
12 SHEETS—SHEET 1.
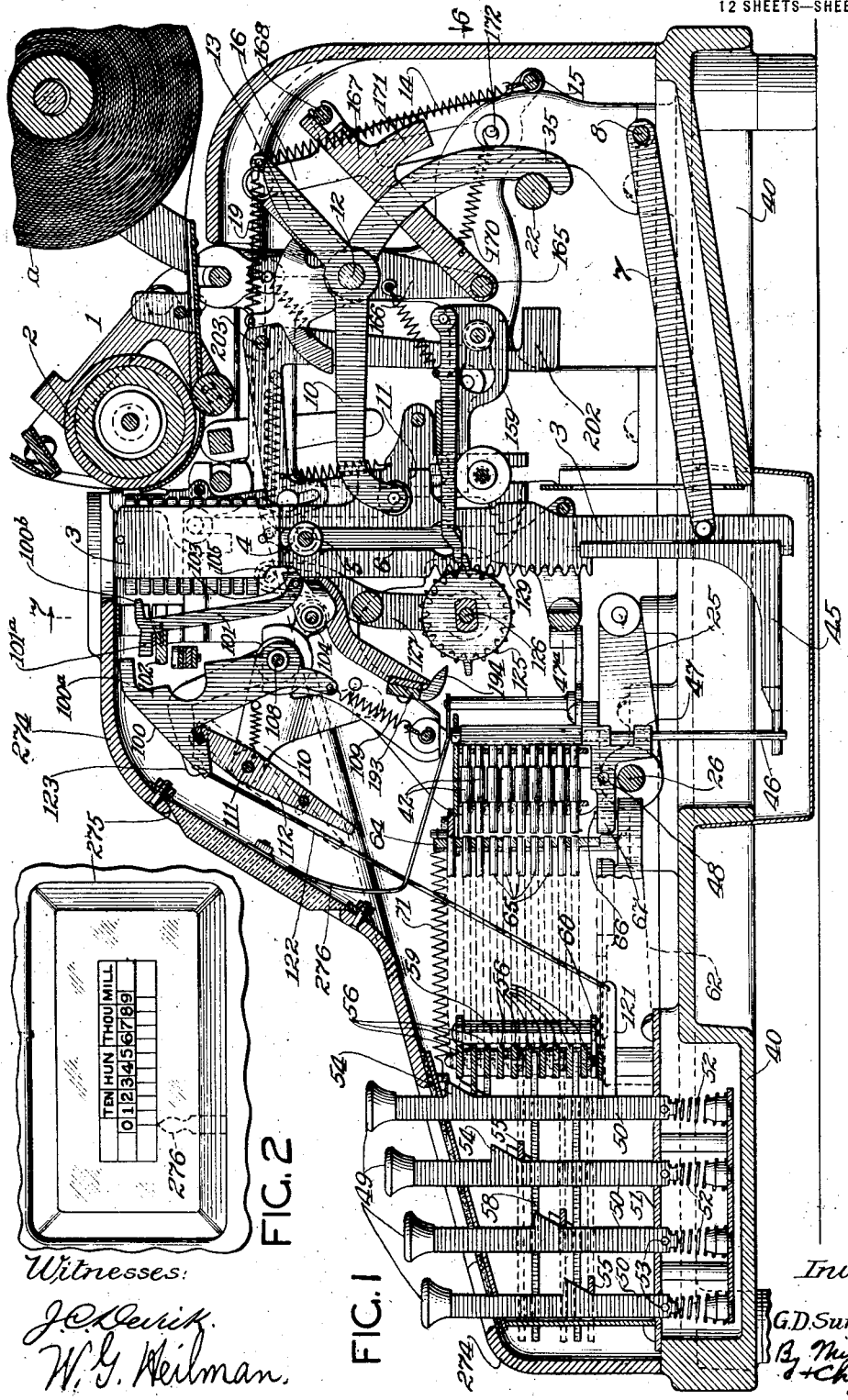

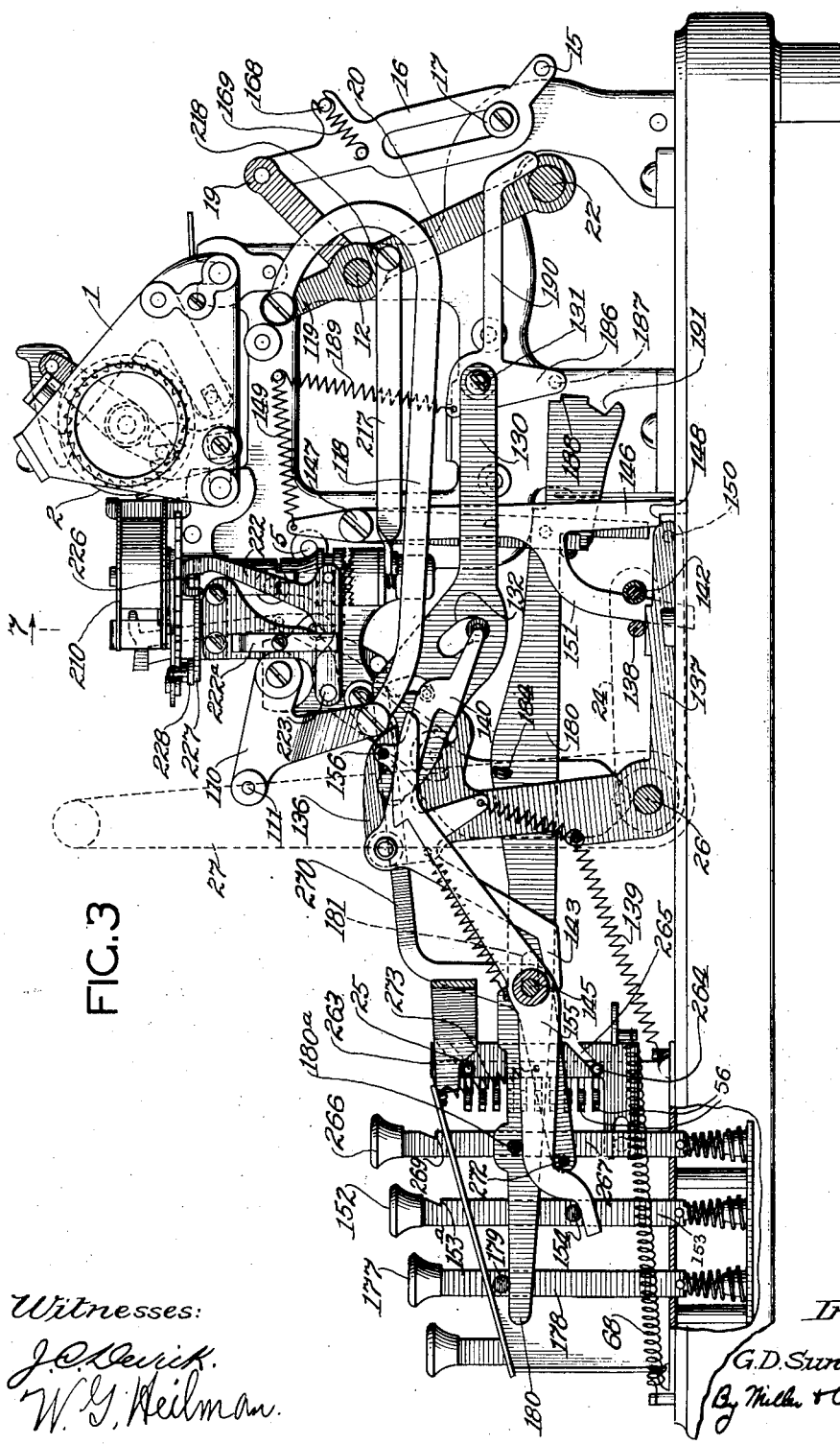

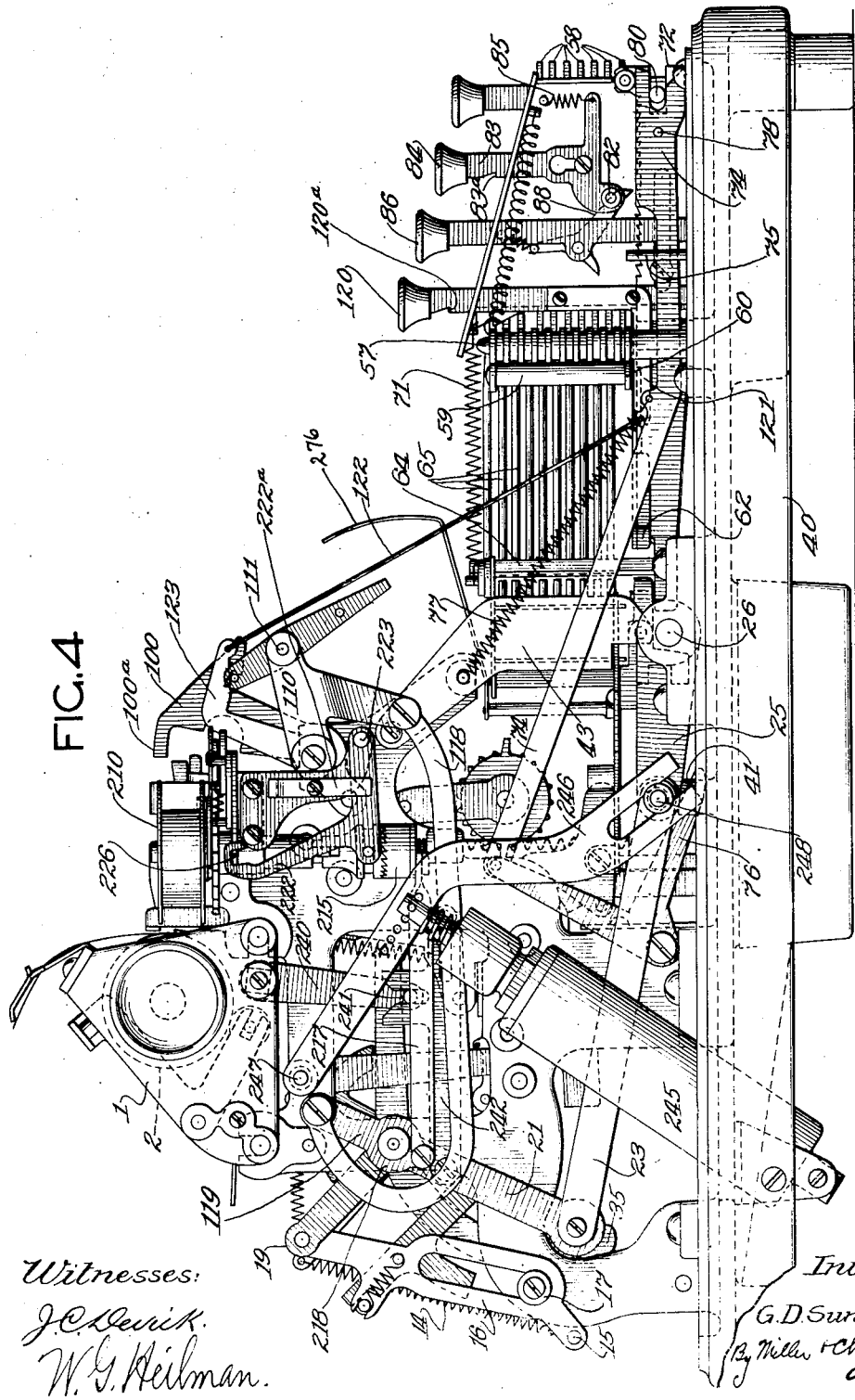

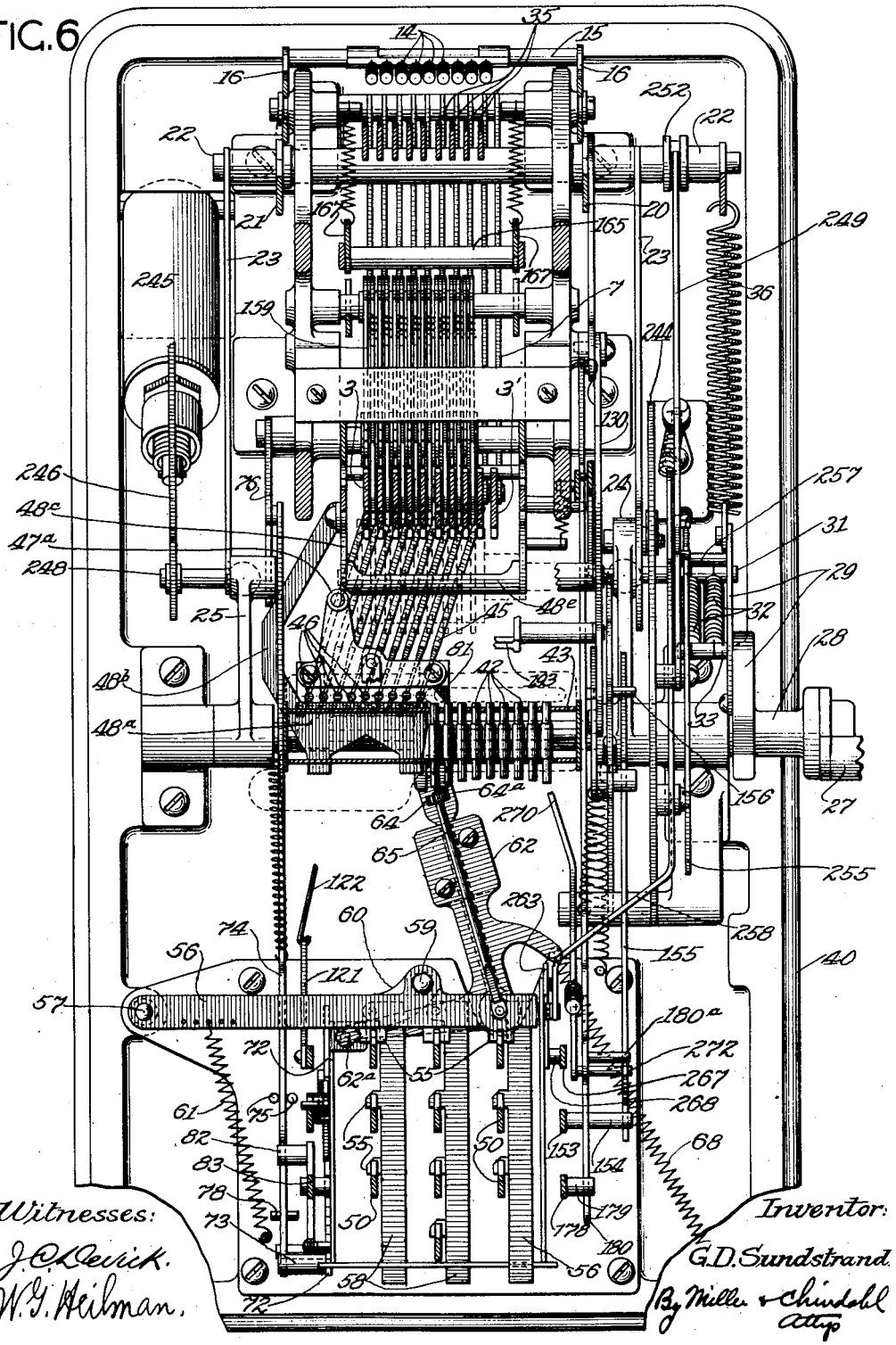

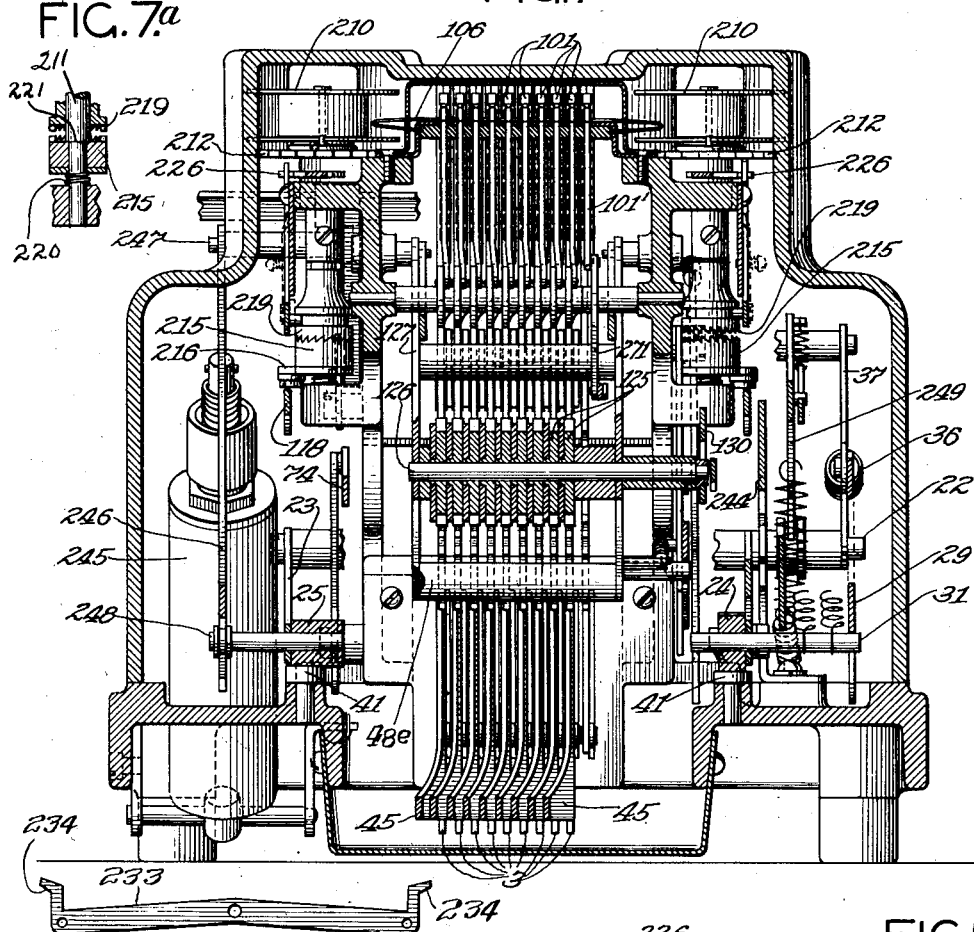

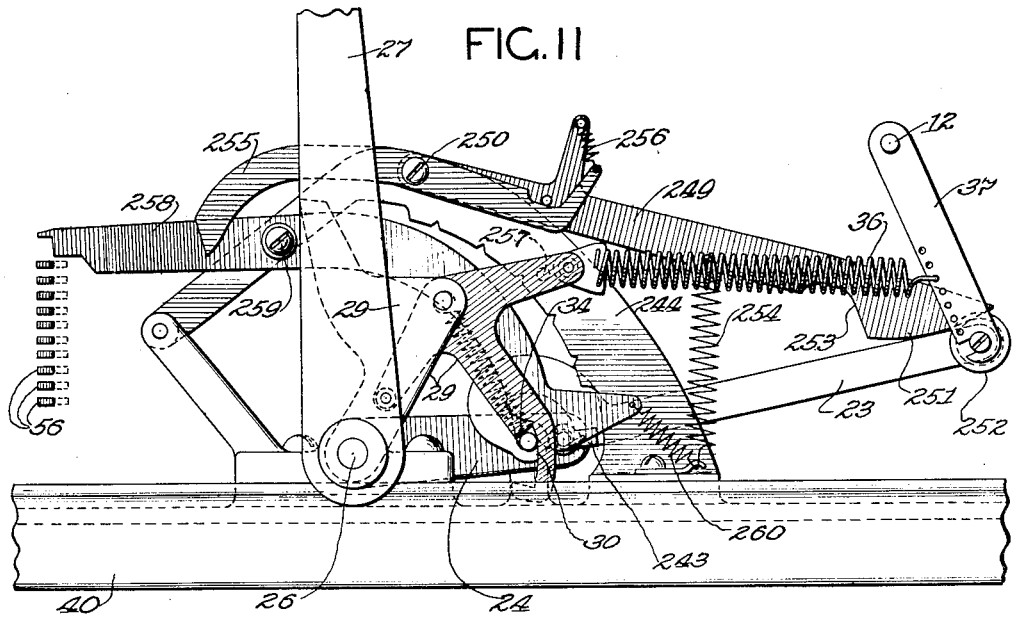
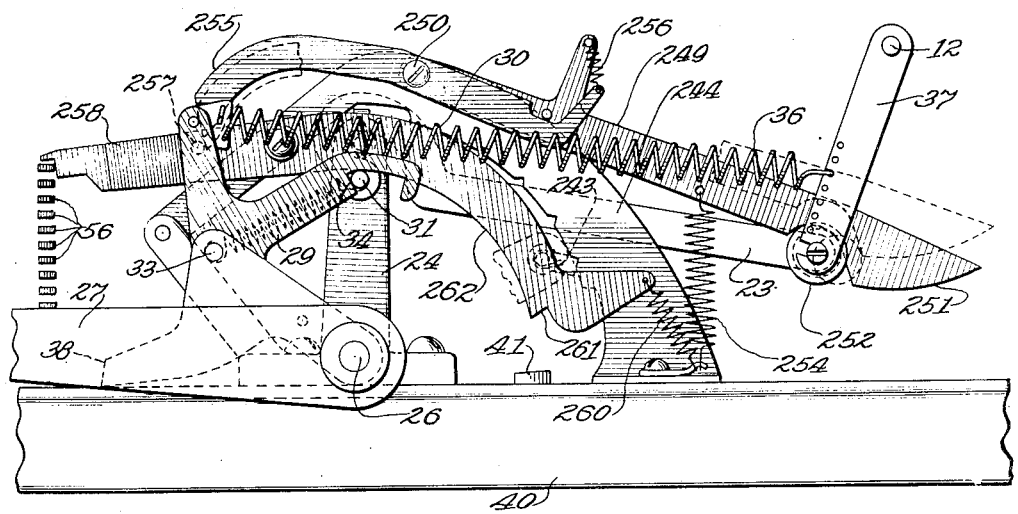

G. D. SUNDSTRAND.
ADDING AND LISTING MACHINE.
APPLICATION FILED MAR. 14, 1914.
1,198,487. Patented Sept. 19, 1916.
12 SHEETS—SHEET 8.
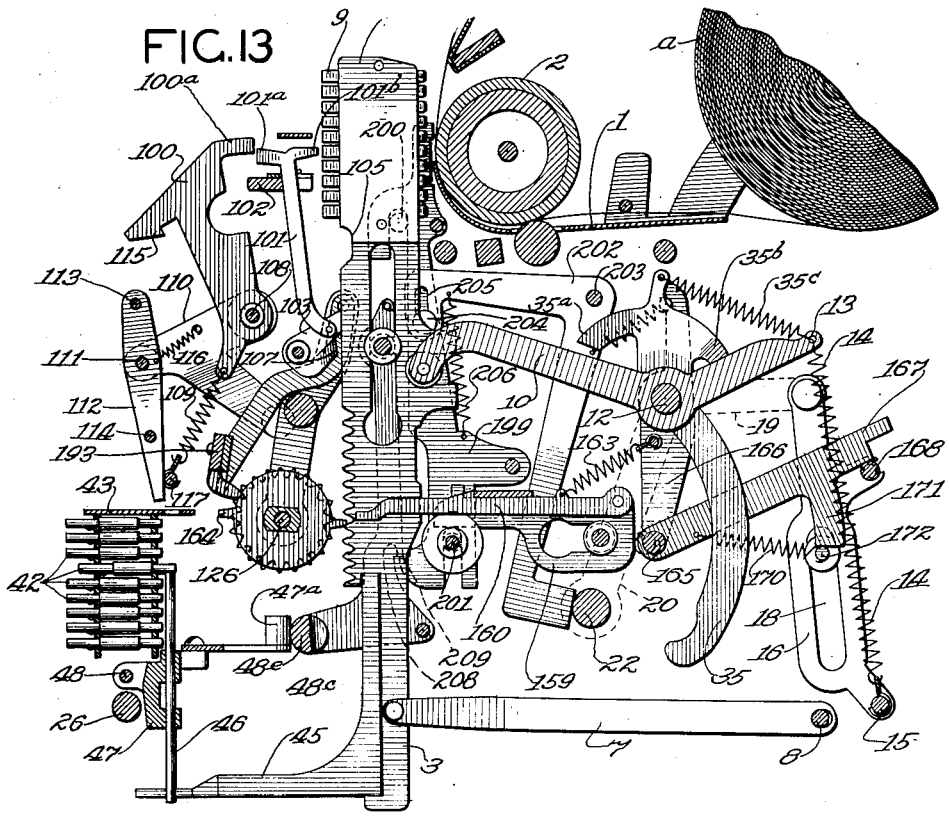
FIG. 13
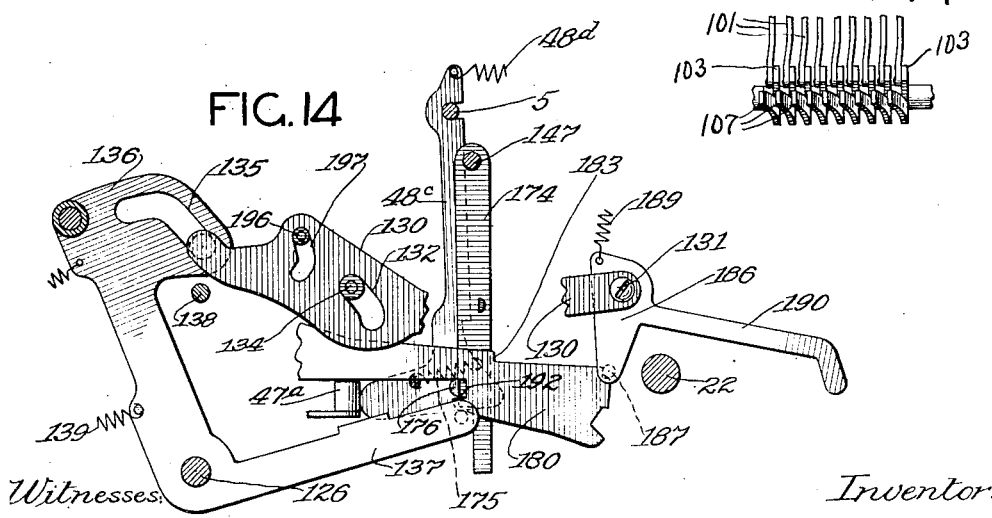
FIG. 14
FIG. 14a
Witnesses:
J. C. Devick
W. G. Heilman
Inventor:
G. D. Sundstrand
By Miller & Chindahl
Attys

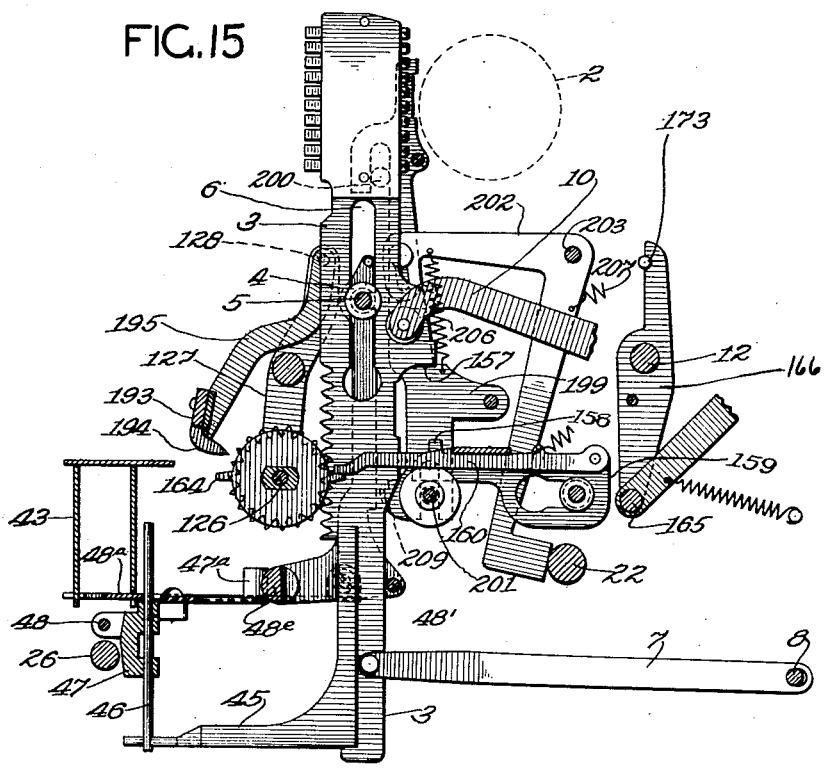

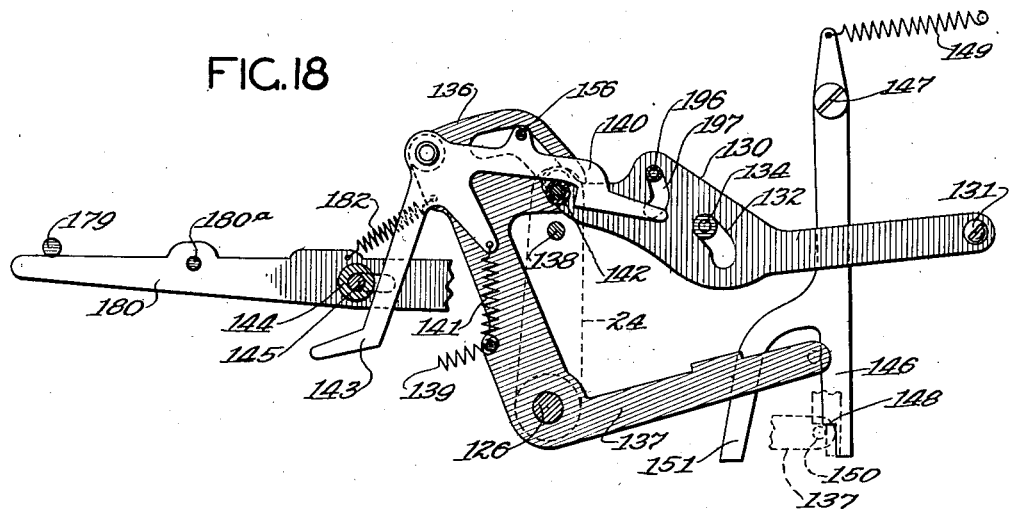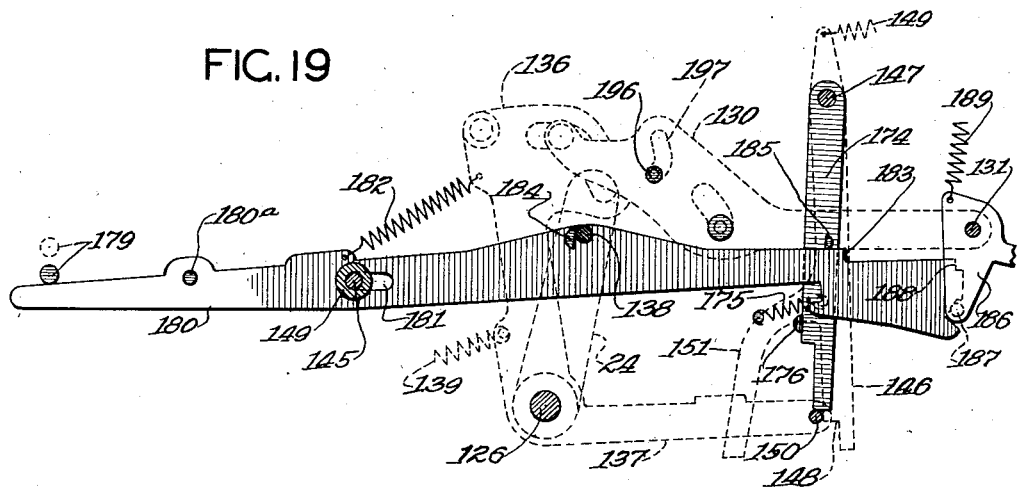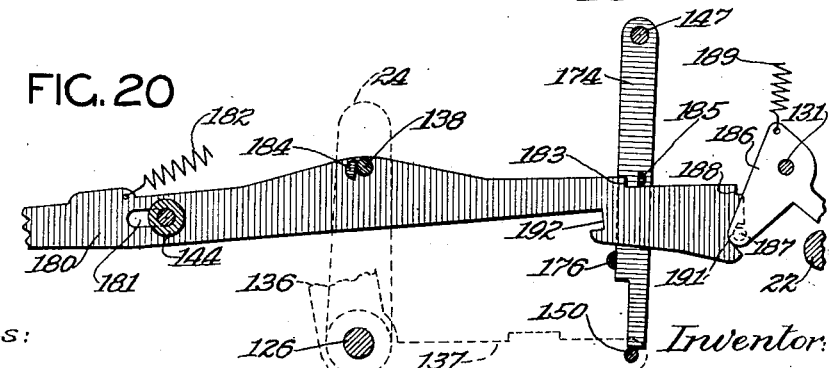

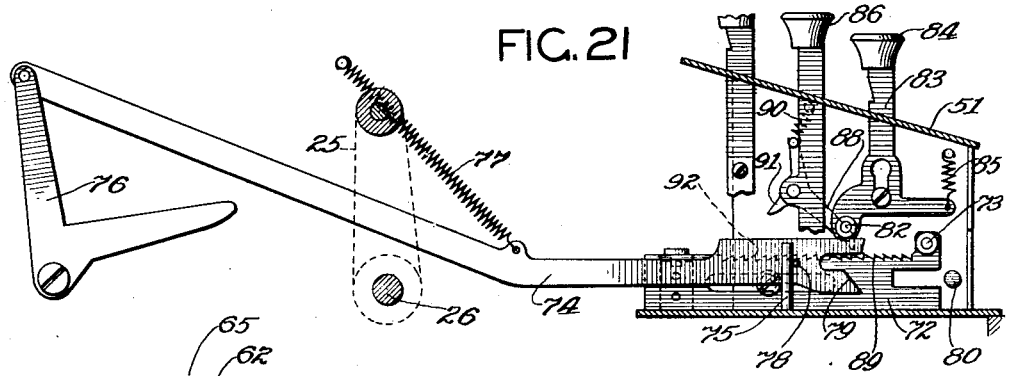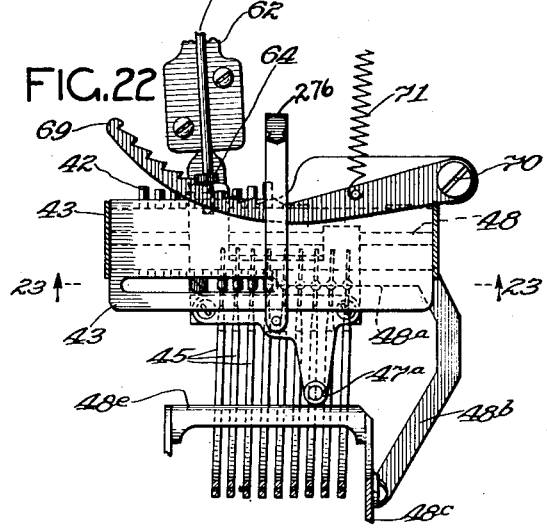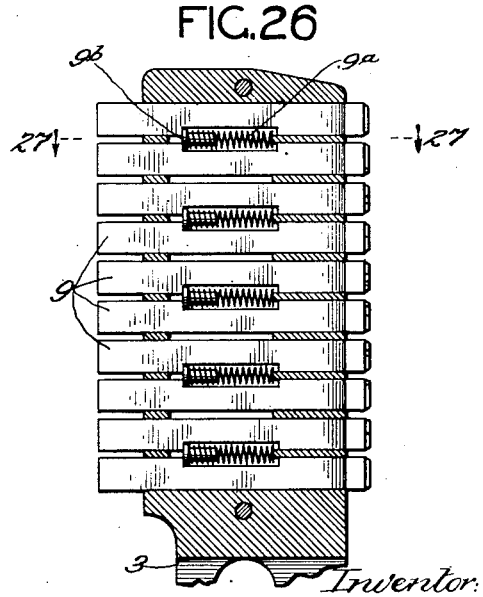

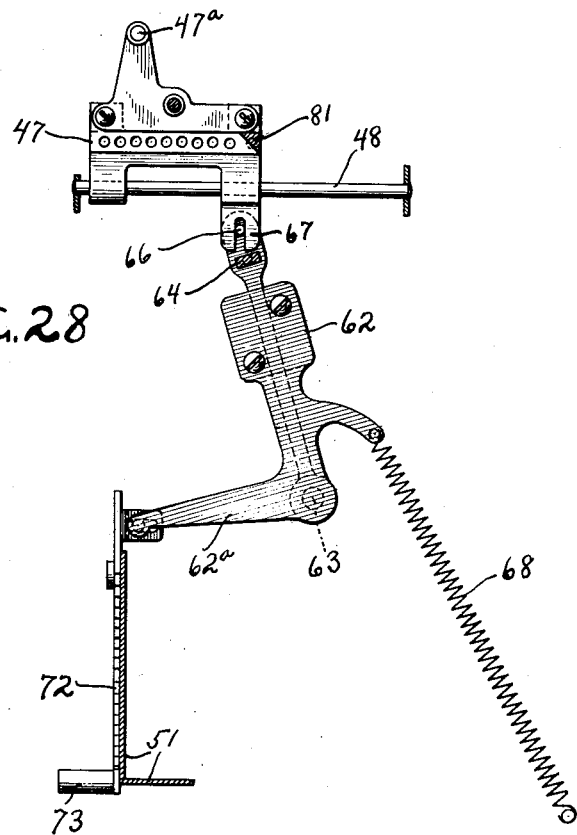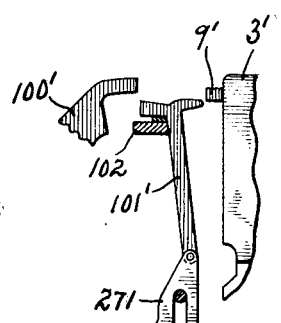

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

ADDING AND LISTING MACHINE.

1,198,487. Specification of Letters Patent. Patented Sept. 19, 1916.

Application filed March 14, 1914. Serial No. 824,610. REISSUED

*To all whom it may concern:*

Be it known that I, GUSTAF DAVID SUNDSTRAND, a citizen of the United States, residing at Rockford, in the county of Winnebago and State of Illinois, have invented certain new and useful Improvements in Adding and Listing Machines, of which the following is a specification.

This invention relates to machines for adding together a plurality of items and for printing the items and the total upon a sheet or strip of paper.

The invention is herein shown as embodied in a machine of the ten-key type.

Among the objects of the invention are to provide improved means for setting the stops that determine the extent of movement of the racks or actuating members; to improve the means for carrying from one numerical order to the next higher order; to provide improved means for reciprocating the racks or actuators; to provide means for controlling the speed of operation of the adding and printing mechanisms; to produce means in a ten-key machine for automatically obtaining a subtotal; and to improve the means for effecting the printing of items and totals in contrasting colors.

In the accompanying drawings, Figure 1 is a longitudinal, vertical sectional view of a machine embodying the features of my invention. Fig. 2 is a fragmental front view, showing a sight opening and indicator. Fig. 3 is a view taken in the plane of dotted line 3—3 of Fig. 5, and showing parts of the machine in side elevation, the inclosing casing and the roll-holding bracket being omitted. Fig. 4 is a side elevation, with the casing omitted, the view being taken from the side opposite to that shown in Fig. 3. Fig. 5 is a top plan view, the casing being omitted. Fig. 6 is a horizontal section taken in the plane of dotted line 6 of Fig. 1. Fig. 7 is a transverse vertical section taken on the plane of dotted line 7 of Figs. 1 and 3. Fig. 7ª is a fragmental sectional view of the ribbon-driving means. Figs. 8, 9 and 10 illustrate the ribbon-feed reversing mechanism. Fig. 10ª is a detail view of a part comprised in the reversing mechanism. Fig. 10ᵇ illustrates the connection between the ribbon spool and its driving means. Figs. 11 and 12 represent the yieldable connection between the actuating crank or handle and the main rock shaft, the means for insuring that said shaft shall complete its full movement in one direction before the crank makes its return stroke, and the means for locking the keyboard while the actuating crank is being moved. Fig. 13 is a fragmental sectional view of the adding and printing mechanisms. Fig. 14 illustrates the means for controlling the movement of the adding pinions into and out of mesh with the racks. Fig. 14ª is a rear view of a portion of the printing mechanism. Fig. 15 is a fragmental view illustrating the parts in the act of printing a total. Fig. 16 shows the parts as being ready to add an item, the rack being about to begin its upward movement. Fig. 17 represents the parts in the position assumed after carrying has been effected and before the carrying mechanism has been restored to its normal position. Fig. 18 shows certain parts in the positions assumed just before the pinions are thrown into mesh to add an item. Fig. 19 illustrates the parts in the positions assumed as the handle or actuating crank is completing its forward stroke in the taking of a final total. Fig. 20 shows the positions assumed as the handle is about to commence its return stroke. Fig. 21 illustrates the means for restoring the stops to normal position, together with the error-correcting means and the repeat means. Fig. 22 is a fragmental plan view of the stops and stop-setting devices. Fig. 23 is a rear elevation of the stops and related devices. Fig. 24 is a longitudinal sectional view of one of the stops. Fig. 25 is a section on line 25—25 of Fig. 24. Fig. 26 is a sectional view of one of the printing bars. Fig. 27 is a section on line 27—27 of Fig. 26. Fig. 28 is a plan view of a certain swinging bracket and a slide that moves with said bracket. Fig. 29 is a detail view of the signal printing mechanism.

The sheet or tape on which the items and totals are to be printed may be supported in any ordinary or suitable way. Herein, I have shown a roll *a* of paper supported upon a carriage 1 which may, if desired, be mounted upon the framework of the machine in the usual way for sliding movement in order that a plurality of columns may be printed upon a sheet. Rotatably positioned on the carriage 1 is a cylindrical platen 2.

The printing is effected by means of vertically reciprocatory bars 3, one such bar being provided for each numerical order.

The machine herein illustrated is adapted to register and print up to 999,999,999, hence nine bars 3 are employed. Said bars are arranged side by side, and each is guided by a grooved roller 4 rotatably mounted on a rod 5 fixed in the framework, said roller being located in a vertical slot 6 in the bar. Each bar is also guided by a link 7 pivoted at one end to the lower end of the bar and at its other end to a fixed rod 8.

Each bar 3 is provided at its upper end with ten type-carrying plungers 9 adapted to print from naught to nine, respectively. The top plunger is adapted to print "0," the next to the top "1", and so on. As shown in Fig. 26, between every two adjacent plungers is placed a spring 9ª which acts through a member 9ᵇ to restore the plungers to normal position after each actuation.

The means for vertically moving each bar 3 into and out of printing position comprises an arm 10 carrying a roller that lies in a notch 11 in the bar. The arm 10 is loosely mounted on a fixed shaft 12. Rigid with the arm 10 is an arm 13 which is yieldingly connected through a coiled spring 14 to a rod 15. The latter is carried by two side members 16 (Figs. 3 and 6) which are guided for approximately vertical movement by roller studs 17, said studs being mounted in the framework and lying in elongated openings 18 in the side members 16. Pivoted to the upper ends of the side members 16 are arms 19 (Figs. 3 and 4) which are pivotally mounted on the shaft 12. Rigid with the arms 19 are two arms 20 and 21 which carry a rod 22. The end portions of the rod 22 are connected through two links 23 (Figs. 4, 6 and 11) to two crank arms 24 and 25 fixed on the main rock shaft 26. The shaft 26 is arranged to be rocked by means of a handle or crank 27, mounted on said shaft. In order that the handle may yield slightly in case of some casual resistance to the movement of the mechanism, the handle is connected to the shaft in the manner to be now described.

The handle 27 is rigid with a sleeve 28 (Fig. 6) which in turn is rigid with a bracket 29. In the bracket 29 is a notch 30 within which lies a pin 31 fixed in the crank arm 24. A spring or springs 32 stretched between the pin 31 and a pin 33 fixed in the bracket 29 normally hold the pin 31 against the end wall 34 (Fig. 11) of the notch 30.

When the operator pulls the handle forward, the springs 32 cause the crank arms 24 and 25 to swing upwardly, thereby drawing the rod 22 forward, and moving the side members 16 and the rod 15 downward. The movement of the rod 15 is yieldingly transmitted through the springs 14 and the arms 13 and 10 to such of the bars 3 as are at liberty to rise. When the operator releases the handle upon the completion of the forward stroke, means to be later described returns the handle to its normal position (shown in dotted lines in Fig. 3). The means for moving down those bars 3 which were raised in the forward stroke of the handle comprises arms 35 pivotally mounted on the shaft 12, there being one such arm for each bar 3. Rigid with each arm 35 are two lugs 35ª and 35ᵇ adapted to bear against the adjacent arms 10 and 13, respectively. A spring 35ᶜ tends to hold the lug 35ᵇ and the arm 13 in contact with each other. During the back stroke of the handle, the rod 22 is moved against the arms 35 which are associated with the bars 3 that were raised in the forward stroke of the handle. When the rod 22 moves said arms 35 rearwardly, the spring 35ᶜ or the lug 35ª restores the bars 3 to their initial (lower) position.

The means for returning the handle to its normal or initial position consists of a spring 36 (Figs. 5 and 11) which is connected at one end to the bracket 29 and connected at its other end for convenience to a link or bar 37 pivoted on one end of the shaft, said link bearing against the end of the rod 22. Comparison of Figs. 11 and 12 will show that the spring 36 is stretched during the forward stroke of the handle.

Forward movement of the handle is limited by contact of the portion 38 (Fig. 12) with a stop surface 39 (Fig. 5) on the base 40. Rearward movement of the handle is limited by engagement of the crank arms 24 and 25 with buffers 41 (Figs. 4 and 12).

The means for limiting the extent to which the bars 3 may rise, and thus to determine which numerals shall be brought to the printing position, comprises a group of stops 42 (Figs. 1, 13, 23, 24 and 25), each stop being horizontally slidable, in a forward and back direction, in a stationary guide frame 43. There is one vertical row or tier of nine stops for each numerical order. A spring detent 44 (Fig. 24) carried by each stop yieldingly holds the stop in either of its two positions. When moved rearwardly from the position shown in Figs. 1 and 24, the stops are in the path of movement of devices carried by the bars 3, and thereby limit the upward movement of said bars. These devices consist of arms 45 pivoted to the lower portions of the bars 3, and pins 46 having openings through which the arms 45 extend. The pins 46 are guided for vertical movement in a slide 47 which is mounted on a stationary guide rod 48 extending transversely of the machine. The guide rod 48 is so positioned with respect to the guide frame 43 that the slide 47 is movable to carry the pins 46 from their normal or initial position at the left-hand side of the group of stops 42 into vertical alinement with the tiers of stops. To permit of such movement, the arms 45 are pivoted, as before stated, to the bars 3, and extend slidably through the openings in the lower ends of the pins 46.

Referring to Fig. 23; the bars 3 are normally in position to print ciphers. When a bar 3 is raised until its pin 46 stops against a projected stop 42 in the second horizontal row from the bottom, said bar is in position to print the numeral "1." The stops 42 in the third row from the bottom are arranged to cause the printing of the numeral "2"; and so on. When the end of an arm 45 stops against the lower side of the slide 47, the bar 3 associated with said arm is in position to print the numeral "9." With the parts arranged as shown in Fig. 23, the amount "5319" will be printed. Those bars 3 which are not needed in printing the items "5319" (namely, those bars which are associated with the five pins 46 which are farthest to the right in Fig. 23) are prevented from rising when the handle is pulled forward, by a detent plate 48$^a$ guided to move in a horizontal plane, said plate being connected through a bar 48$^b$ (Fig. 6) to a rigid frame 48$^c$. The frame 48$^c$ is mounted to swing on the axis of the rod 5 (Fig. 14), and is normally impelled forward by springs 48$^d$. When the slide 47 is in the initial position (see Fig. 6), the detent plate 48$^a$ is out of the vertical plane of the pins 46. As soon as the slide moves one step to the right, a roller stud 47$^a$ on the slide crowds back the bar 48$^e$ of the frame 48$^c$ and thereby draws the plate 48$^a$ back far enough to overlie all of the pins 46 except the one farthest to the right.

The means for projecting the stops 42 into the path of the pins 46 comprises a plurality of keys 49 which are numbered from "0" to "9" as shown in Fig. 5. The stems 50 of the keys are mounted for vertical movement in a guide frame 51 located on the forward end of the base 40. For each key stem there is provided a coiled spring 52 adapted to restore the key to its normal position after a depression thereof, the upward movement of the key being limited by a stop pin 53 which stops against a portion of the frame 51. On each stem 50 is an inclined or wedge-shape lug 54. The lugs 54 on the three key stems which are farthest to the rear lie in contact with lugs 55 on the three horizontal levers 56 which are pivoted upon a post 57, each key being arranged to swing one of said levers. The lugs 54 on the remaining six key stems lie in contact with lugs 55 on six horizontally reciprocable bars 58. The bars 58 are reciprocable forward and back in the guide frame 51, and are pivoted at their rear ends to six levers 56 pivoted on the post 57. A universal rod 59 is attached at its ends to the top lever 56 and to a lever 60 pivotally mounted on the post 57. The rod 59 extends adjacent to the levers 56 and thus is moved whenever one of the keys 49 is depressed. A spring 61 connected to the top lever 56 serves to restore all of the levers 56 and the bars 58 after depression of the keys.

A bracket 62 (Figs. 5 and 28) is pivoted on the center indicated at 63 in Fig. 5, and carries a guide 64 (Fig. 1) in which are slidably supported the rear ends of ten push pins 65. The forward end of each push-pin 65 is pivoted to one of the levers 56. The push-pins 65 are arranged in a vertical row or tier, and all except the uppermost push-pin is adapted to push the stops 42 out of the position shown in Fig. 1 and into the path of the upward movements of the pins 46.

The bracket 62 is caused to move in unison with the slide 47 by means of a pin 66 fixed to the bracket and lying within the bifurcation of a lug 67 on the slide. As the operator sets up an item on the keyboard, the slide 47 and the bracket 62 are moved (by means to be presently described), said slide and bracket moving from one vertical row of stops 42 to the next adjacent row, as each number key is depressed and restored. The purpose in thus moving the pins 46 and the push pins 65 is to permit of setting up the item in the regular or direct order, (i. e., the numeral of the highest order first, the next highest next, etc.) instead of in reversed order. This will be understood when it is remembered that the bar 3 which is farthest to the left corresponds to the highest numerical order which the machine is capable of printing; so likewise the vertical tier of stops 42 which is farthest to the left, corresponds to the highest order in the item to be set up.

The series of push pins normally stands in front of the vertical tier of stops which is farthest to the left, and is moved to successive tiers of stops as the setting up of the item progresses. The series of pins 46 is moved from left to right, step by step,— one step for each numerical order in the item being set up—thereby bringing the necessary number of pins 46 into vertical alinement with the stops that have been set by the push pins 65.

The slide 48 and the bracket 62 are moved to the right by a coiled spring 68 (Fig. 5). The spring is controlled by an escapement consisting of the uppermost push pins 65, a tooth 64$^a$ formed on the upper end of the guide 64, and a curved ratchet bar 69 pivoted to the framework at 70, the bar 69 being yieldingly held against the pin 65 or tooth 64$^a$ by a spring 71. The top lever 56 being connected to the universal rod 59, the top push pin 65 will be moved whenever any of the keys 49 are depressed. When the push pin 65 pushes a tooth of the ratchet bar 69 clear of the tooth 64$^a$, the spring 68 pulls the bracket 62 to the right until the push pin stops against the said tooth of the ratchet bar. When the push pin is withdrawn from said ratchet-bar tooth, the spring 68 pulls the bracket 62 farther to the right until the tooth 64ᵃ stops against the next tooth of the ratchet bar.

The slide 48 and bracket 62 are moved to the left, into the initial position, by means comprising a slide bar 72 (Figs. 6 and 21) which has a pin-and-slot connection with the arm 62ᵃ (Fig. 28) of the bracket 62. On the forward end of the bar 72 is a roller stud 73. A bar 74 is guided between pins 75 for movement alongside the bar 72. The rear end of the bar 74 is pivoted to one arm of a bell crank 76. A spring 77, tends to move the bar 74 rearwardly into the position shown in Fig. 21, the action of the spring being limited by the stop pin 78. The bar 74 is moved forwardly by the arm 25 which engages an arm of the bell crank 76. In the forward movement of the bar 74 said bar pushes against the roller stud 73 and thus restores the slide 47 and the bracket 62 to initial position. As the bar 74 approaches the forward limit of its movement, the inclined surface 79 strikes a fixed pin 80, whereby the bar 74 is caused to descend until the bar is clear of the roller stud 73. As soon as the bar is clear of the roller stud, the spring 68 moves the tooth 64ᵃ against the first tooth of the ratchet bar 69.

In the movement of the bracket 62 and the slide 47 to the initial position, the stops 42 that had been set are pushed forward to the initial position by a bar 81 (Figs. 6 and 23) fixed to the slide 47, said bar having an inclined face that forces the stops into initial position. As soon as the bar 74 descends so as to clear the roller 73, the spring 68 moves the tooth 64ᵃ against the first tooth of the ratchet bar and thus moves the bar 81 far enough to the right so that stops in the first vertical tier can be set.

When the bar 74 and the pin 80 are in engagement, the pin holds the bar down. At other times, upward movement of the bar is limited by a roller stud 82 (Fig. 21) mounted on the stem 83 of the repeat key 84. A spring 85 normally holds the key elevated; when depressed and slightly tilted backward, the shoulder 83ᵃ engages under the top wall of the guide frame 51 and holds the key (and hence the bar 74) down. When the bar is so held down, it will not on its forward movement, engage the roller stud 73, and therefore the slide 47 and the carriage 62 will not be restored, and the set stops will not be restored by the bar 81. The last item may therefore be again printed.

In case the operator, when setting up an item, should strike a wrong number key, he may correct the error by operating a key 68 to restore the slide 47 and the carriage 62 to the position occupied just before the error occurred, thus restoring the improperly set stop. A spring similar to the springs 52 (Fig. 1) normally holds the stem 87 of the error key 86 elevated. On the stem 87 is pivoted a pawl 88 adapted to engage teeth 89 in the upper edge of the bar 72. A spring 90 tends to hold the pawl in the position shown in Fig. 21. When the error key 86 is depressed, the pawl 88 engages the bar 72 and moves it forward far enough to restore the slide 47 and carriage through the distance of one step on the escapement. To prevent the bar 72 from moving through momentum when the error key is depressed, there is provided on the pawl 88 a tooth 91 adapted to come into engagement with one of the teeth 92 on the bar 72 when the bar has moved forward sufficiently far under the action of the pawl 88.

The means for driving the type-carrying plungers 9 into contact with the inking ribbon comprises a series of hammers 100, one for each bar 3, and a series of devices 101 (hereinafter termed bumpers) for transmitting the blows of the hammers to the type-carrying plungers. All of the hammers are actuated whenever the handle is drawn forward. The bumpers are normally in such position as to be out of the range of the hammers. When an amount is to be printed, the bumpers corresponding to the bars 3 which are to do the printing are moved into the range of the respective hammers.

The bumpers 101 are guided in a slotted guide plate 102, and each is pivoted to an arm 103 which is loosely mounted on a pivot rod 104. Each bar 3 has a notch 105 in its forward edge for the reception of the free end of the adjacent arm 103. When the bar 3 is down (as in Fig. 1), the free end of the arm 103 lies in the notch 105, and the bumper is below the path of oscillation of the head 100ᵃ of the hammer. When, however, the bar 3 is raised, the lower end wall of the notch 105 cams the arm 103 up into the position shown in Fig. 13, thereby raising the bumper so that the head 101ᵃ is in the path of the hammer head 100ᵃ, and so that the point 100ᵇ is in proper position to strike a plunger 9. A wire spring 106 lying behind the bumpers 101 restores the bumpers after each blow of the hammers.

As hereinbefore stated, the bars 3 are initially in position to print ciphers, and consequently when a cipher is to be printed there is no upward movement which may be utilized in raising the bumper. Other means is therefore provided for raising the bumpers which are to print ciphers. This means consists of a lug 107 (Fig. 14ᵃ) on each arm 103 arranged to underlie the arm 103 which is next to the right. When any arm 103 is raised, the lug 107 on that arm raises the arm 103 next to the right if said arm is not raised by its bar 3. Gravity restores the bumpers 101 to their initial (lower) position after each operation.

The hammers 100 are pivoted on a rod 108, and are actuated by individual springs 109. The means for drawing the hammers forward to place the springs 109 under increased tension, and for releasing the hammers, comprises two arms 110 (Figs. 1–3–4 and 5) pivoted on the rod 108. A rod 111 is pivotally mounted in the arms 110. Fixed to the rod 111 are two levers 112 which are rigidly connected together by cross-rods 113—114 (Fig. 13). The cross-rod 113 is adapted to engage hooks 115 on the hammers 100. A spring 116 tends to hold the rod 113 in engagement with said hooks. When the arms 110 rise from the position shown in Fig. 13, the rod 113 passes into engagement with the hooks 115 (see Fig. 1). On the next downward swing of the arms 110, the rod 113 will cause the hammers 100 to swing forward against the tension of the springs 109 until the lower ends of the levers 112 strike the stationary bar 117, whereupon the continuing movement of the arms 110 causes the rod 113 to leave the hooks 115; the springs 109 then impel the hammers against any bumpers 101 that may have been raised. The arms 110 are oscillated by means of links 118 which extend between said arms and arms 119, the latter being rigidly connected to the arms 20.

When it is not desired to print an amount, the printing mechanism may be disabled by means comprising a non-print key 120. To the stem of this key is fixed an arm 121 which is connected through a rod 122 to an arm 123 pivoted on the rod 108. The arm 123 overlies the rod 113. When the key 120 is depressed, the arm 123 causes the rigid frame formed of the parts 112, 113, 114, to turn on the axis 11 (as shown in dotted lines in Fig. 1), so that when the arms 110 swing downward the rod 113 will fail to engage the hooks 115 and hence the hammers will not be drawn forward or "set". The key 120 is held depressed at will by the engagement of the locking shoulder 120ª with the top plate of the frame 51.

The adding mechanism comprises a series of adding pinions 125 rotatably mounted upon a shaft 126 which is carried by a frame 127 pivoted at 128 (Fig. 15). The pinions 125 (of which there is one for each bar 3) are adapted to mesh with rack teeth 129 formed in the bars 3. When an item is to be added, the frame 127 is swung forward to disengage the pinions 125 from the racks 129 before the bars 3 are raised, and said frame is swung rearwardly just before the bars 3 are moved downwardly. Addition therefore occurs in the down-stroke of the bars 3, the extent of rotation of the pinions depending, of course, upon the extent of movement of said bars.

The frame 127 is swung to carry the pinions into and out of mesh with the racks 129 by means of a lever 130 (Fig. 3) pivoted to the framework of the machine at 131. In the lever 130 is a cam slot 132 in which lies an antifriction roller 134 on the end of the adding-pinion shaft 126. On the free end of the lever 130 is a roller stud that lies in a cam slot 135 (Fig. 14) in a lever 136. The lever 136 is pivotally mounted on the rock shaft 26, and has an arm 137 which is arranged to be engaged by a pin 138 on the arm 24. A spring 139 tends to move the lever 136 in the direction to move the pinions out of mesh with the racks. When the operator begins to pull the handle 27 forward, the pin 138 leaves the arm 137, and thereby allows the spring 139 to throw the pinions out of mesh with the racks. When the handle begins to return to normal position, the pinions must be placed in mesh with the racks, which result is effected by the following described means: On the lever 136 is pivoted a hook 140 which is acted upon by a spring 141. Said hook is adapted to yield to allow a stud 142 on the crank arm 24 to pass on the front stroke of the handle, said hook springing into engagement with the stud as the handle completes its forward stroke. On the back stroke of the handle, the hook 140 causes the lever 136 to move with the crank arm 24, thus throwing the pinions into mesh. At the proper point in the back stroke of the crank arm 24, the lever 136 is released therefrom through the rising of the hook 140 due to contact of the finger 143 of said hook with a spacing sleeve 144 on a fixed pivot rod 145. When the hook 140 is thus disengaged from the stud 142, the lever 136 is prevented from swinging forward under the influence of the spring 139 by a latch 146 pivoted at 147, said latch having a locking shoulder 148. A spring 149 tends to hold the latch 146 against a pin 150 on the arm 137. On the latch 146 is a finger 151 adapted to be engaged by the pin 138 on the crank arm 24. In the back stroke of the crank arm 24, the pin 150 passes under the locking shoulder 148 just before the hook 140 is disengaged from the arm 24. As the arm 24 finishes its back stroke, the pin 138 thereon engages the finger 151 and pushes the latch out of engagement with the pin 150, the pin 138 then serving to hold the arm 137 down.

It will be seen that when addition is to occur, the spring 139 throws the pinions out of mesh with the racks before the latter begin their upward movement, and that the pin 138, acting through the hook 140, throws the pinions into mesh with the racks just before the racks commence to move down.

It sometimes is desirable to print an item without adding it to the amount already accumulated. This may be accomplished by means acting to disable the hook 140 so that the pinions shall not be thrown into mesh with the racks at the beginning of the downward stroke. Said means include a non-add key 152, the stem 153 of which has a pin 154 arranged to bear against the forward end of a lever 155, said lever being pivotally supported on the pivot rod 145. The rear end of the lever 155 extends below a pin 156 on the hook 140. The non-add key may be locked in its depressed position by placing the locking shoulder 153ᵃ (Fig. 3) under the top plate of the guide frame 51. When the operator depresses the non-add key 152, the rear end of the lever 155 lifts the hook 140 and holds it elevated, so that when the crank arm 24 makes its return stroke the pin 142 does not engage the hook 140. The pinions, therefore, stay out of mesh with the racks until the pin 138, by pressing against the arm 137, moves the pinions into mesh with the racks, the latter by that time having reached their normal (lower) position.

Referring now to the means for carrying from one numerical order to the next higher order: It has been explained that the bars 3 are moved to their normal (lower) position by the rod 22 acting through the arms 35, the springs 35ᶜ and the arms 13 and 10. The extent of the downward movement of the bars 3 is limited (except in the carrying operation) by contact of the shoulders 157 (Fig. 16) on the bars 3 with stop lugs 158. When an amount is to be carried from one order to the next higher order, the stop lug 158 for the bar 3 belonging to such higher order is withdrawn, thereby allowing that bar to descend under the action of gravity and the spring 35ᶜ until the upper portion of the bar stops against the roller 4. The extent of such descent is just sufficient to turn the adding pinion for that bar through the distance of one tooth. Each stop lug 158 is formed on a slide 159 which is guided for horizontal reciprocation. To each slide is pivoted a dog 160 having a tooth 161 adapted to lie in front of a stationary locking plate 162. A spring 163 tends to hold the tooth 161 in engagement with the plate 162 and also tends to pull the dog 160 and the slide 159 rearwardly. When the tooth 161 is in engagement with the front edge of the plate 162, the stop lug 158 is in position to limit the downward movement of the adjacent bar 3. When the tooth 161 is disengaged from the edge of the plate, the spring 163 pulls the dog and the slide back so that the stop lug 158 is out of the path of movement of the bar 3.

The means for disengaging the tooth 161 from the plate 162 consists of two diametrically opposite lugs 164 fixed to the pinion of the next lower order. (In this embodiment of the invention, two lugs 164 are provided because each pinion has twenty teeth). When the amount accumulated on a pinion reaches 9, continued rotation of the pinion as the rack descends brings one of the lugs 164 against the ends of the dog 160, thereby depressing the dog until the tooth 161 is below the front edge of the plate 162, whereupon the spring 163 pulls the dog and the slide 159 rearwardly until the lug 158 stops against the plate 162. The lug 158 is then out of the path of the rack of the next higher order, and the latter therefore moves down under the influence of the spring 35ᶜ to the extent permitted by the roller 4.

After each carrying operation, the slide 159 is restored to its normal (forward) position by a universal rod 165 which is supported by two arms 166 that are pivotally mounted on the shaft 12. Connected to the rod 165 are two bars 167 having notched upper ends that rest upon a rod 168 carried by the side members 16. The rod 168 is yieldingly held in sockets in said side members by springs 169 (Figs. 3 and 5). Springs 170 hold the bars 167 against the rod 168 and tend to draw the rod 165 rearwardly.

In the downward movement of the side members 16 (and therefore in the upward movement of the bars 3), the rod 168 pushes against the notched ends of the bars 167 and thus moves the universal rod 165 against the slides 159, thereby restoring any slides that may have been concerned in a previous carrying operation. At about the moment when the slide or slides 159 are restored, lugs 171 (Fig. 13) on the bars 167 are in contact with stop pins 172. Continued downward movement of the bars 167 being then impossible, the continuing downward movement of the side members 16 causes the rod 168 to yield laterally sufficiently to pass below the notched ends of the bars 167, whereupon the springs 170 pull the universal rod 165 rearwardly away from the slides 159. The action of the springs 170 is limited by stop pins 173 (Fig. 15).

Summarizing the description of the carrying operation it may be stated that the steps are as follows: The pinions are thrown out of mesh; the racks rise; the operated slide or slides 159 are restored (moved forward) and the restoring rod 165 is withdrawn rearwardly while the racks are rising; after the racks have risen and before they begin to descend, the pinions are thrown into mesh; and the racks descend, revolving the pinions and perhaps bringing a lug 164 against a dog 160 and disengaging said dog from the front edge of the plate 162. Upon disengagement of the dog, the slide 159 moves rearwardly, withdrawing the stop lug 158 for the rack of next higher order, whereupon said rack descends an additional amount sufficient to revolve its pinion through the distance of one tooth.

When a subtotal or a final total is to be printed, the pinions are retained in mesh with the racks during the upward movement of the bars 3, and the extent of the upward movement of said bars is determined by contact of the lugs 164 with the underside of the forward ends of the dogs 160. To retain the pinions in mesh with the racks when the handle 27 is pulled forward, I provide a latch 174 (Fig. 14) pivoted at 147, the lower end of said latch being adapted to overlie the pin 150 and thus hold down the arm 137 when the handle 27 and the crank arm 24 make their forward stroke. A spring 175 tends to hold the latch 174 in operative position and against a pin 176 on the swinging frame 48$^c$. When no item is set up on the key board (as is the case when the total is to be printed), the swinging frame 48$^c$ is in its forward position, and the latch 174 is therefore in position to hold the pinions in mesh with the racks.

It may be here stated that when any pinion stands at zero, one of the lugs 164 on said pinion lies directly beneath one of the dogs 160. Thus when a total is to be printed, those racks which mesh with the pinions standing at zero cannot rise, the remaining racks rising until the rotation of their pinions brings the lugs 164 thereon into contact with the respective dogs 160. The bars 3 are then in position to print the total amount accumulated on the pinions.

When it is not desired to clear the machine after printing a total, the pinions are allowed to remain in mesh with the racks during the downward movement thereof, and therefore during the downward movement of the racks the several pinions are rotated to the positions they occupied just before the taking of the total. When, however, the operator wishes to clear the machine, the pinions are withdrawn from the racks before the latter descend, thus leaving all of the pinions standing at zero. This is accomplished by withdrawing the latch 174 from the pin 150 just before the racks descend. Said latch is withdrawn by means comprising a total key 177 (Fig. 3), the stem 178 of which has a stud 179 that overlies the forward end of a lever 180. The lever 180 has an elongated opening 181 through which the pivot rod 145 extends. It will be seen that the lever 180 is movable longitudinally to a slight extent. A spring 182 tends to slide the lever 180 rearwardly. On the rear portion of the lever is a shoulder 183 (Fig. 19). A stud 184 is located on the lever 180 in position to be engaged by the pin 138 on the crank arm 24 when the total key is depressed. When a final total is to be printed and the machine cleared, the operator depresses the total key 177, thereby placing the lever 180 against a stud 185 on the latch 174, as shown in Fig. 19, and placing the stud 184 in the path of the pin 138. The operator then pulls the handle 27 forward, thereby swinging the crank arm 24 up, the pin 138 striking the stud 184 and pushing the lever 180 forward until the shoulder 183 has passed the stud 185 (as in Fig. 20).

As soon as the crank arm starts on its back stroke, the spring 182 slides the lever 180 rearwardly, bringing the shoulder 183 against the stud 185, and swinging the latch 174 off the pin 150. The spring 139 thereupon immediately throws the pinions out of mesh with the racks, whereupon the racks, under the action of the springs 14, fly up to the top limit of their movement. In the continuation of the back stroke of the handle, the racks are drawn down to normal position by the rod 22 in the manner before explained.

I have just explained how the pinions are thrown out of mesh with the racks at the beginning of the back stroke of the crank arm 24, when a final total is to be taken. The pinions are prevented from being thrown into mesh, through the action of the roller stud 142, by means acting to hold the hook 140 out of the range of said stud. Said means comprises a pin 180$^a$ on the lever 180, which pin overlies the lever 155. When therefore the total key is depressed, the lever 155 is also actuated to hold the hook 140 in inoperative position.

In taking a final total, the total key should be depressed before the handle 27 is operated. To prevent depression of the total key after the handle has been pulled forward to a material extent, there is provided a latch 186 (Fig. 3) pivoted at 131 and having a pin 187 adapted to lie in a notch 188 in the rear end of the lever 180. A spring 189 tends to hold the latch in operative position. Rigid with the latch is a finger 190 arranged to be engaged by the rod 22 to hold the latch out of operation when the rod 22 and the handle 27 are in their normal positions. When the handle 27 begins to move forward, the latch 186 moves into engagement with the notch 188 and locks the lever 180 against actuation. If the lever 180 is actuated before the handle 27 is pulled forward, the latch 186 moves into engagement with a notch 191 in the lever 180 and locks the lever in operated position, so that the operator need not continue to hold the total key depressed.

To prevent the mechanism from being operated to take a total so long as there is an item which has been set up but not added, I provide a notch 192 (Fig. 14) in the lever 180, which notch is adapted to receive the stud 176 on the swinging frame 48ᶜ. It will be remembered that said frame is in its forward position at the commencement of the operation of setting up an item, and that as soon as a number key is depressed, the roller 47ᵃ causes the frame to swing back. When the frame is in its forward position, the stud 176 is out of the notch 192, but when the frame swings back, the stud 176 passes into the notch 192 and locks the total lever 180 against actuation.

While a dog 160 is in the position indicated in Fig. 17, its forward end is not in position to serve as a stop for a lug 164 in the taking of a total. It is therefore desirable to prevent the taking of a total while any of the dogs 160 are out of their normal position. This is accomplished by means comprising cam shoulders 3ᵃ (Fig. 17) on the bars 3. When any bar 3 descends below its normal position (as it does in the carrying operation), the shoulder 3ᵃ on said bar engages a rod 48' on the swinging frame 48ᶜ, and thus moves said frame back far enough to bring the detent plate 48ᵃ in the path of upward movement of the pins 46. An attempt to obtain a subtotal by pulling the handle 27 forward will therefore merely bring all of the pins 46 against the plate 48ᵃ without imparting material upward movement to any of the bars 3 except the bar or bars that were below their normal position. The rearward movement of the frame 48ᶜ also disengages the latch 174 from the pin 150, so that the pinions are thrown out of mesh with the racks before the abnormally low racks rise. In other words, the pinions are thrown out of mesh and returned into mesh just as though an item were being added. The rearward movement of the frame 48ᶜ also places the stud 176 in the notch 192 of the total lever 180, thereby locking the latter against actuation.

To prevent casual rotation of the pinions while they are out of mesh with the racks, I provide a bar 193 (Fig. 15) having fixed thereto a locking tooth 194 for each pinion. The bar 193 is fixed at its ends to two links 195 which are pivoted at 128. Before the pinions are entirely out of mesh with the racks, the teeth 194 are moved into engagement with the pinions, said teeth moving forward with the pinions as the latter complete their withdrawing movement. When the pinions return into mesh with the racks, the teeth 194 follow the pinions until the latter are in mesh with the racks, whereupon the teeth 194 are moved forward away from the pinions. These movements are imparted to the teeth 194 by means of a roller stud 196 (Fig. 18) on the end of the bar 193, said stud lying in a cam slot 197 in the lever 130.

The embodiment herein shown of my invention is adapted to print items and totals in contrasting colors, as, for example, items in blue and totals in red. For this purpose, the ribbon 198 (Fig. 10) may consist of two longitudinal fields or color bands, the lower being red and the upper blue. That portion of the ribbon which is directly behind the bars 3 is supported and guided in a rigid frame comprising two side members 199 (Fig. 13), said frame being guided for vertical movement by guides 200 and 201 which coact with slotted portions of the side members. 202 are two bell crank levers pivoted at 203. One arm of each lever 202 is connected to one of the side members 199 by a screw 204 extending through an elongated opening 205 in said arm. Springs 206 tend to raise the ribbon-carrying frame with reference to the bell crank levers 202. The other arms of the bell crank levers 202 are arranged to be engaged by the rod 22 and thereby moved in the direction to raise the ribbon. Springs 207 (Fig. 15) assist gravity in returning the ribbon-carrying frame to its lower position. It will be seen that every forward movement of the rod 22 will tend to raise the ribbon into position to print red. In order that the ribbon shall be raised only when a total is to be printed, I provide means for holding the ribbon-carrying frame down when an item is to be printed. This means comprises locking shoulders 208 on the swinging frame 48ᶜ arranged to be engaged by similar shoulders 209 on the side members 199. When the swinging frame 48ᶜ is in its forward position (as it is when no item is set up on the keyboard), the shoulders 208 are out of the path of the upward movement of the shoulders 209, and consequently printing may be done in red; but when an item is to be printed, the frame 48ᶜ occupies its rear position and the shoulders 208 prevent upward movement of the ribbon-carrying frame, the springs 206 yielding as the rod 22 moves forward.

The ribbon 198 may be fed in any suitable manner, and, if desired, may have its direction of feed movement reversed by any preferred means. Herein means is shown for automatically feeding the ribbon and for reversing its movement when one of the spools is emptied.

The ribbon spools 210 (Figs. 8 and 10) are removably mounted upon the upper ends of vertical shafts 211. To each shaft 211 is fixed a ratchet wheel 212. The spool is caused to revolve with the shaft by means of a stud 213 on the spool, which stud is adapted to fit within a loop 214 that frictionally engages the hub of the wheel 212. Each of the shafts 211 is arranged to be driven by means of a clutch collar 215 (Fig. 7) loosely mounted on the lower portion of each shaft. To each collar 215 is affixed an arm 216 which is connected through a link 217 (Fig. 3) to an arm 218, the latter being rigid with the arm 119. Thus the clutch collars 215 are oscillated whenever the handle 27 is operated.

The clutch collars 215 are arranged to coact with similar collars 219 non-rotatably mounted on the shaft 211 but capable of vertical movement on said shafts. Springs 220 tend to move the collars 215 into engagement with the collars 219, the upper limit of movement of the collars 215 being determined by contact of said collars 215 with shoulders 221 (Fig. 7ª) on the shafts 211. The collars 219 are alternately held up out of engagement by the collars 215 by means of levers 222, which are pivoted at 223, said levers having pins 224 that lie within peripheral grooves 225 in the collars 219. The means for operating the levers 222 to raise and lower the collars 219 comprises arms 226 which lie within hooks formed on the upper ends of the levers 222. Rigid with each arm 226 is an arm 227. The arms 227 are connected by a link 228. It will be seen that when the arms 227 are oscillated, the collars 219 will be raised and lowered. To yieldingly hold the collars 219 in adjusted position, there is provided a detent 229 pivoted at 230 on the link 228, and having V-shape recesses to receive a fixed stud 231. A spring 232 holds the detent 229 yieldingly in engagement with the stud 231. The means for moving the link 228 to shift the clutch collars 219 comprises a bar 233 pivoted intermediate its ends, as at 230, to the link 228, each end of said bar having a tooth 234 adapted to be engaged by the adjacent ratchet wheel 212. On the ends of the bar 233 are pivoted arms 235 having lugs 236 that are adapted to lie in contact with the lower flanges of the spools 210. Springs 237 hold the lugs 236 against the spool flanges and tend to hold the bar 233 in a neutral position wherein both teeth 234 are out of reach of the ratchet wheels 212.

A plunger 238 is mounted on each spool for radial movement, a spring 239 tending to project the outer end of the plunger into position to engage the adjacent lug 236. The laps of the ribbon normally hold the plunger 238 within the periphery of the spool. When the ribbon is almost wholly unwound from one of the spools, the plunger 238 on that spool springs outwardly and in the continuing rotation of the spool is carried against the adjacent lug 236, thereby tilting the bar 233 and throwing the tooth 234 at the end opposite from said plunger into the path of the teeth of the ratchet wheel which is adjacent to the full spool. In its rotation, said ratchet wheel engages the tooth 234 and pushes the bar 233 and the link 228 endwise until the stud 231 has passed from one of the notches in the detent 229 to the other. Such endwise movement of the link 228 causes the collar 219 for the full spool to be raised out of reach of the companion collar 215, and lowers the collar 219 for the empty spool into engagement with its coacting collar 215, whereby the direction of movement of the ribbon is reversed. As soon as the direction of movement is reversed, the springs 237 place the bar 233 in neutral position. Friction plates 222ª serve by their pressure to hold the levers 222 in adjusted positions.

The plate 2 may be rotated to space the lines of printing by any common or suitable means. Herein the line-space mechanism has not been illustrated in detail, but the actuating connections are shown in Fig. 4. They consist of an arm 240 having a pin 241 that lies between two lugs on a bar 242. The front end of the bar 242 is slidably supported, while the rear end thereof is connected to the arm 21. Thus a line-space movement is imparted to the platen in every oscillation of the handle 27.

Any suitable means may be used to prevent reversal of movement of the handle 27 prior to the completion of its movement. Herein is shown a dog 243 (Figs. 11 and 12) pivoted on the arm 24 and arranged to move in contact with a stationary notched locking segment 244 as the arm 24 oscillates. In whichever direction the arm 24 moves, the dog 243 lies in position to prevent reverse movement until the dog has passed the ends of the operative surface of the segment.

As hereinbefore explained, the handle 27 is yieldingly connected to the power-transmitting arm 24 through the springs 32. The speed of operation of the shaft 26 to which the arm 24 is fixed may be controlled or governed by any ordinary or preferred means such as a dashpot 245 (Fig. 4), the piston rod of which is pivoted to a lever 246, one end of said lever being pivoted at 247. The other end of the lever is slotted to engage a roller stud 248 on the crank arm 25, which crank arm is fixed to the shaft 26. The dashpot prevents excessively high speed of oscillation of the shaft 26.

If the handle 27 were pulled forward at excessive speed so that the springs 32 yielded and the pin 31 lagged behind the shoulder 34, the mechanisms driven by the shaft 26 might not complete their full forward movement before the handle began its return stroke. To prevent such an occurrence, I provide means for preventing return movement of the handle before the arm 24 has completed its forward movement. Said means comprises a lever 249 (Fig. 11) pivoted, for convenience, to the segment 244 at 250. On the rear end of the lever 249 is a cam surface 251 arranged to rest upon a grooved antifriction roller 252 on the rod 22. (The rod 22, it will be remembered, is connected to the arm 24 through the link 23.) Forward of the cam surface 251 is a recess 253. A spring 254 holds the lever 249 in contact with the roller 252. To the forward end of the lever 249 is pivoted a stop arm 255, a spring 256 allowing the stop arm to yield upwardly to permit a pin 257 on the bracket 29 to pass forward. When the handle 27 is drawn forward at a proper speed, the roller 252 passes off the cam surface 251 and into the recess 253 just as the pin 257 passes the forward end of the stop arm 255, so that said stop arm rises under the action of the spring 254, and does not interfere with the immediate return of the handle 27. If, however, the handle is pulled forward at excessive speed, so that the pin 31 lags behind the shoulder 34, the roller 252 does not pass into the recess 253 until after the pin 257 has passed the front end of the stop arm 255; the latter, therefore, under the action of the spring 256, moves into place behind the pin 257 and prevents return movement of the handle until the roller 252, and hence the arm 24, have completed their full forward movement.

To prevent the number keys 49 from being operated while the handle 27 is being actuated I provide a lever 258 (Figs. 5, 11 and 12) which is pivoted at 259. The forward end of said lever is adapted to move into position behind the top lever 56, and thus prevent depression of the number keys. A spring 260 tends to tilt the lever 258 out of locking position. On the rear portion of the lever 258 is a cam portion 261 adapted for engagement by the pin 31. When the handle 27 is drawn forward, the pin 31, acting against the cam surface 261, tilts the lever 258, thereby placing its forward end in locking engagement with the top lever 56. The lever 258 is held in such position, through the contact of the pin 31 with the concentric surface 262, until the handle 27 is returned to its normal position.

To lock the number keys at any time against actuation, there is provided a bar 263 (Figs. 3 and 6) extending vertically adjacent to the free ends of the levers 56. The bar 263 is supported for movement toward and away from the levers 56 by means of studs 264 that extend through inclined slots 265 in said bar. The bar is arranged to be moved by a lock key 266, the stem 267 of which has a pin 268 that lies in a slot in a horizontal extension of the bar 263. The key 266 may be locked in depressed position, to hold the bar 263 against the ends of the levers 56, by means of a shoulder 269 on the stem 267, which shoulder may be engaged with the top wall of the guide frame 51.

If desired, means may be provided for printing a distinguishing character in connection with certain imprints, as, for example, in connection with a total, or an item which is printed but not added to the previous items. Herein is shown a special signal-printing bar 3' (Figs. 6 and 29) which has no movement and which carries but one type-plunger 9'. The bumper 101' for transmitting the blow of the signal-printing hammer 100' to the type-plunger 9' is raised and lowered by means of a lever 270 (Fig. 3), said lever being pivoted at 145. The rear end of the lever 270 is connected to the bumper 101' by a link 271. The forward end of the lever 270 has a pin 272 (Fig. 6) that underlies the non-add-lever 155. A spring 273 (Fig. 3) tends to move the lever 270 to lower the bumper 101'. It will be seen that whenever the non-add key 152 or the total key 177 is depressed, the bumper 101' will be raised into operative position, thus printing the distinguishing character in blue opposite each non-added item, and in red opposite each total.

The mechanisms are inclosed by a casing 274. If desired, a glazed sight-opening 275 may be provided in the upper forward portion of the casing, and on the glass plate closing said opening may be placed suitable indicia, as, for example, those shown in Fig. 2. A pointer 276 attached to the slide 47 indicates to the operator the position of the slide, and hence the number of digits that have been set up.

While I have described the present embodiment of my invention with considerable particularity, I would have it understood that the invention is not limited to the particular construction and arrangement shown, and that various features of the invention are susceptible of use in adding machines of differing types.

I claim as my invention:

1. In an adding machine, a plurality of actuators, each having a movable stop portion, a stationary group of stops, means for setting the stops, and means for moving said movable stop portions into operative alinement with the set stops.

2. In an adding machine, a plurality of actuators, an arm pivoted to each actuator, a stop on each arm, a stationary group of stops, means for setting the stops, and means for swinging said arms to place the stops on said arms in operative alinement with the set stops.

3. In an adding machine, a plurality of vertically movable actuators, each having a stop portion movable in a horizontal plane, a stationary group of stops, means for setting the stops, and means for moving said stop portions into operative alinement with the set stops.

4. In an adding machine, a plurality of vertically movable actuators, an arm pivoted to each actuator to swing in a horizontal plane, a stop portion on each arm, a stationary group of stops, means for setting the stops, and means for swinging said arms into operative alinement with the set stops.

5. In an adding machine, a plurality of actuators, an arm pivoted to each actuator, a stop on each arm, a group of stops, means for setting the stops, the stops on the arms being normally at one side of the group of stops, and means for swinging said arms toward the group of stops to place the stops on said arms in operative alinement with the set stops.

6. In an adding machine, a plurality of vertically movable actuators, each having a stop portion movable in a horizontal plane, a group of stops located above the normal horizontal plane of the stop portions, means for setting the stops, and means for moving said stop portions into operative alinement with the set stops.

7. In an adding machine, a plurality of vertically movable actuators, an arm connected to each actuator to swing in a horizontal plane, a stop portion on each arm, a group of stops, means for setting the stops, and means for swinging said arms into operative alinement with the set stops.

8. In a stop mechanism for adding machines, a stationary group of stops, a plurality of push pins, means to cause the series of push pins to swing as a unit across the series of stops, and means for actuating the push pins to set the stops.

9. In a stop mechanism for adding machines, a stationary group of stops, a plurality of push pins mounted to swing on a common axis, means for swinging the free ends of said push pins into position adjacent the various stops, and means for actuating said push pins to set the stops.

10. In a stop mechanism for adding machines, a stationary group of stops, a pivoted bracket, a plurality of key-actuated levers, a push pin pivoted to each lever, the free ends of said push pins being supported by said bracket, means for swinging said bracket to carry the free ends of the push pins into operative relation to the various stops, and means for moving said bracket in the opposite direction.

11. In a stop mechanism for adding machines, a group of stops, a push pin, means to cause the free end of the push pin to swing across the group of stops, and means for projecting the push pin against the stops.

12. In a stop mechanism for adding machines, a stationary group of stops, a plurality of push pins, means for moving said push pins into position adjacent the various stops, and means for projecting said push pins against the stops.

13. In a stop mechanism for adding machines, a stationary group of stops, a pivoted bracket, a plurality of key-actuated levers, a stop-setting member connected to each lever, the free ends of said members being supported by said bracket, and means for swinging said bracket to carry the free ends of the members into and out of operative relation to the various stops.

14. In a stop mechanism for adding machines, a stationary group of stops, a movable support, a plurality of stop-setting members carried by said support, means for moving said support to carry said members into and out of operative relation to the various stops, and means for actuating said stop-setting members.

15. In a stop mechanism for adding machines, a stationary group of stops arranged in tiers, a pivoted bracket, a tier of push pins supported by said bracket, means for swinging said bracket to carry said push pins into and out of operative relation to the several tiers of stops, and means for projecting the push pins against the stops.

16. In a stop mechanism for adding machines, a stationary group of stops arranged in tiers, a tier of push pins, means for moving said push pins into and out of operative relation to the several tiers of stops, and means for projecting said push pins against the stops.

17. In a stop mechanism for adding machines, a stationary group of stops arranged in tiers, a movable support, a tier of push pins carried by said support, means for moving said support to carry said push pins into and out of operative relation to the several tiers of stops, and means for projecting the push pins against the stops.

18. In a stop mechanism for adding machines, a plurality of key-actuated levers having a common axis, a push pin connected to each lever, a group of stops adapted to be set by said pins, and means for causing relative movement between the push pins on the one hand and the group of stops on the other.

19. In a stop mechanism for adding machines, a plurality of key-actuated levers having a common axis, a push pin pivoted to each lever, the pivotal axes of said pins being equidistant from the axis of said levers, a group of stops adapted to be set by said push pins, and means for causing relative movement between the push pins on the one hand and the group of stops on the other.

20. In a stop mechanism for adding machines, a stationary group of stops, a pivoted support, a plurality of key-actuated levers, a push pin pivoted to each lever and adapted to set the stops, the free ends of said push pins being supported by said support, a spring tending to move said support in one direction, a ratchet bar, a tooth on said support arranged to engage said bar, and means carried by said support for disengaging said ratchet bar from said tooth.

21. In a stop mechanism for adding machines, a stationary group of stops, a pivoted support, a plurality of key-actuated levers, a push pin pivoted to each lever and adapted to set the stops, the free ends of said push pins being carried by said support, a spring tending to move said support in one direction, a ratchet bar, a tooth on said support adapted to engage said bar, another lever arranged to be moved by any of the key-actuated levers, and a part pivoted to said other lever, adapted to disengage the ratchet bar from said tooth.

22. In a stop mechanism for adding machines, a stationary group of stops, a pivoted support, a plurality of key-actuated levers having a common axis, a stop-setting pin pivoted to each lever, the free ends of said push pins being carried by said support, a spring tending to move said support in one direction, another lever pivoted on the same axis as the key actuated levers, a ratchet bar, a tooth on said support arranged to engage said bar, and a push pin on said other lever, arranged to disengage said bar from said tooth.

23. In a stop mechanism for adding machines, a plurality of key-actuated levers having a common axis, a group of stops, a stop-setting device connected to the free end of each lever, and means for causing relative movement between the push pins on the one hand and the group of stops on the other.

24. In a stop mechanism for adding machines, a stationary group of stops, a movable support, a plurality of key-actuated levers, a stop-setting device connected to each lever, said devices being supported by said support, a spring tending to move said support in one direction, a ratchet bar, a tooth on said support arranged to engage said bar, and means carried by said support for disengaging said ratchet bar from said tooth.

25. In a stop mechanism for adding machines, a stationary group of stops, a movable support, a plurality of key-actuated levers, a stop-setting push pin pivoted to each lever, the free ends of said push pins being carried by said support, a spring tending to move said support in one direction, a ratchet bar, a tooth on said support adapted to engage said bar, another lever arranged to be moved by any of the key-actuated levers, and a push-pin pivoted to said other lever, adapted to disengage the ratchet bar from said tooth.

26. In a stop mechanism for adding machines, a stationary group of stops, a movable support, a plurality of key-actuated levers having a common axis, a push pin pivoted to each lever and adapted to set said stops, the free ends of said push pins being carried by said support, a spring tending to move said support in one direction, another lever pivoted on the same axis as the key-actuated levers, a universal rod connected to said other lever and extending adjacent to the first mentioned levers, a ratchet bar, a tooth on said support arranged to engage said bar, and a push pin on said other lever, arranged to disengage said bar from said tooth.

27. In an adding machine, a stationary group of stops, a plurality of push pins, means for moving said push pins into position adjacent the various stops, means for projecting said push pins against the stops, a plurality of actuators each having a movable stop portion, said push-pin-moving means being arranged to move said movable stop portions into operative alinement with the stops.

28. In an adding machine, a stationary group of stops, a pivoted bracket, a plurality of key-actuated levers, a stop-setting member connected to each lever, the free ends of said members being supported by said bracket; means for swinging said bracket to carry the free ends of said members into and out of operative relation to the various stops, a plurality of actuators, each having a movable stop portion; and means connecting said stop portions to said support, whereby said stop portions are moved into operative alinement with the stops.

29. In an adding machine, a group of stops, a push pin, means to cause the free end of the push pin to swing across the group of stops, means for projecting the push pin against the stops, a plurality of actuators, each having a movable stop portion, and means connecting said movable stop portions to said pin-swinging means, whereby said stop portions are moved into operative alinement with the stops.

30. In an adding machine, a stationary group of stops, a bracket pivoted to swing in a horizontal plane, stop-setting members supported by said bracket, means for actuating said members, means for swinging said bracket to carry said members into and out of operative relation to the various stops, a plurality of actuators, each having a movable stop portion, and means connecting said movable stop portions to said bracket for synchronous movement, whereby said stop portions are moved into and out of operative alinement with the stops.

31. In an adding machine, a stationary group of stops, a pivoted bracket, a plurality of key-actuated levers, a push pin pivoted to each lever, the free ends of said push pins being supported by said bracket, means for swinging said bracket to carry the free ends of the push pins into and out of operative relation to the various stops, a plurality of actuators, an arm pivoted to each actuator, a stop on each arm, a slide engaging the last mentioned stops, said slide being movable transversely of the first mentioned stops, and a connection between said slide and said swinging bracket for effecting synchronous movement of said slide and bracket.

32. In an adding machine, a plurality of vertically movable actuators, an arm pivoted to each actuator to swing in a horizontal plane, a stop on each arm, a group of stops, means for setting the last mentioned stops, a slide movable in a horizontal plane adjacent to the group of stops, the stops on said arms being guided in said slide, and means for moving the slide to carry the stops on said arms into operative alinement with the second mentioned stops.

33. In an adding machine, a group of stops, a plurality of push pins at one side of said group of stops, means for projecting said push pins against the stops, a plurality of actuators each having a movable stop portion, said actuators being located at the other side of said group of stops, and mechanism for moving said movable stop portions and said push pins alongside the group of stops.

34. In an adding machine, a stationary group of stops, a support movable alongside the group of stops, a plurality of key-actuated levers, a stop-setting member connected to each lever, the free ends of said members being supported by said support; means for moving said support to carry the free ends of said members into and out of operative relation to the various stops, a plurality of actuators, each having a movable stop portion; and means to cause said movable stop portions to move with said support.

35. In an adding machine, a group of stops, a push pin, means to cause the free end of the push pin to swing along one side of the group of stops, means for projecting the push pin against the stops, a plurality of actuators at the other side of the group of stops, each actuator having a movable stop portion, and means connecting said movable stop portions to said pin-swinging means, whereby said stop portions are moved into operative alinement with the stops.

36. In an adding machine, a stationary group of stops, a pivoted bracket, a plurality of stop-setting members supported by said bracket, means for actuating said members to set the stops, means for swinging said bracket to carry said members into and out of operative relation to the various stops, a plurality of actuators, each having a movable stop portion, a slide engaging said stop portions, said slide being movable transversely of the first mentioned stops, and a connection between said slide and said swinging bracket for effecting synchronous movement of said slide and bracket.

37. In an adding machine, a plurality of vertically movable actuators, each having a movable stop portion, a group of stops, means for setting said stops, a slide movable in a horizontal plane adjacent to the group of stops, said stop portions being guided in said slide, and means for moving the slide to carry the stop portions into operative alinement with the stops.

38. In an adding machine, two actuators, a slide having a stop to limit movement of one of the actuators, a spring tending to move said slide in the direction to withdraw the stop, means for holding the slide in operative position, and means operated by the other actuator for rendering said holding means ineffective.

39. In an adding machine, two actuators, a slide having a stop to limit movement of one of the actuators, a spring tending to move said slide in the direction to withdraw the stop, a dog pivoted on the slide, a stationary part arranged to be engaged by said dog for locking the slide in operative position, and means operated by the other actuator for disengaging the dog from said part.

40. In an adding machine, two actuators, a slide having a stop to limit movement of one of the actuators, a dog pivoted on said slide, a stationary part arranged to be engaged by the said dog for locking said slide in operative position, a spring tending to hold said dog in engagement with said part, and also tending to move said slide to place said stop against said part, and means operated by the other actuator for disengaging the dog from the said part.

41. In an adding machine, a plurality of actuators, means for imparting the working stroke to said actuators, carrying means, a universal rod for restoring said carrying means, an arm connected to said rod, said arm being arranged to be engaged and moved by said first mentioned means, and means for disengaging said arm from said first mentioned means after the carrying means have been restored.

42. In an adding machine, a plurality of actuators, means for imparting the working stroke to said actuators, carrying means, a universal rod for restoring said carrying means, an arm connected to said rod, said arm being arranged to be engaged and moved by said first mentioned means, and means for disengaging said arm from said first mentioned means, after the carrying means have been restored, and a spring tending to move said restoring rod away from the carrying means.

43. In an adding machine, a plurality of actuators, means for reciprocating said actuators, adding wheels operated in the return stroke of said actuators, carrying means including slidable members, and means actuated in the forward stroke of the actuators for moving the slidable members into normal position.

44. In an adding machine, a plurality of actuators, means for imparting the working stroke to said actuators, carrying means including slidable members, a universal rod for moving said slides into normal position, an arm connected to said rod, said arm being arranged to be engaged and moved by said first mentioned means, and means for disengaging said arm from said first mentioned means after said slidable members have been moved into normal position.

45. In an adding machine, a plurality of actuators, means for imparting the working stroke to said actuators, carrying means including slidable members, a universal rod for moving said slides into normal position, an arm connected to said rod, said arm being arranged to be engaged and moved by said first mentioned means, means for disengaging said arm from said first mentioned means after said slidable members have been moved into normal position, and a spring tending to move said restoring rod away from said slidable members.

46. In an adding machine, a stationary group of stops, a pivoted support, means on the said support for setting the stops, a spring tending to swing said support in one direction, an escapement for controlling the action of the spring, a part connected to said support, a reciprocatory member arranged to engage said part to swing said support against the tension of the spring, and means for disengaging said member from said part after said member has swung the support.

47. In an adding machine, a stationary group of stops, a pivoted support, means on the said support for setting the stops, a spring tending to swing said support in one direction, an escapement for controlling the action of the spring, a part connected to said support, a reciprocatory member arranged to engage said part to swing said support against the tension of the spring, said member having a cam surface thereon, and a stationary element arranged to be engaged by said surface for moving said reciprocatory member out of engagement with said part.

48. In an adding machine, a group of stops, a movable support, means on the said support for setting the stops, a spring tending to move said support in one direction, an escapement for controlling the action of the spring, a part connected to said support, a reciprocatory member arranged to engage said part to restore support, and means for moving said member aside, out of the path of movement of said part, upon the completion of such restoring movement.

49. In an adding machine, a group of stops, a movable support, means on the said support for setting the stops, a spring tending to swing said support in one direction, an escapement for controlling the action of the spring, a part connected to said support, a reciprocatory member arranged to engage said part to swing said support against the tension of the spring, said member having a cam surface thereon, a stationary element arranged to be engaged by said surface for moving said reciprocatory member aside, out of the path of movement of said part.

50. In an adding machine, a stationary group of stops, a pivoted support, means on said support for setting said stops, a spring tending to swing said support in one direction, an escapement for controlling the action of the spring, a part connected to said support, an actuating handle, an arm arranged to move with said handle, a bell crank lever, one arm of which is arranged to be moved by the first mentioned arm, a bar connected to the other arm of said bell crank lever, said bar being arranged to engage said part for swinging said support against the tension of the spring, means for disengaging said bar from said part, and means for moving said bar in the direction opposite to the direction of movement imparted by the first mentioned arm.

51. In an adding machine, a group of stops, a movable support, means on said support for setting said stops, a spring tending to move said support in one direction, an escapement for controlling the action of the spring, a part connected to said support, an actuating handle, a member arranged to move with said handle, a bell crank lever, one arm of which is arranged to be moved by said member, a bar connected to the other arm of said bell crank lever, said bar being arranged to engage said part for moving said support against the tension of the spring, means for disengaging said bar from said part, and a spring for moving said bar in the direction opposite to the direction of movement imparted by said member.

52. In an adding machine, a group of stops, a movable support, means on said support for setting the stops, a spring tending to move said support in one direction, an escapement for controlling the action of the spring, a bar connected to said support for rectilinear movement, a member arranged to reciprocate adjacent to and parallel with said bar, a part on said bar arranged to be engaged by said member, and means for moving said member aside, out of the path of movement of said part.

53. In an adding machine, a stationary group of stops, a pivoted support, means on said support for setting the stops, a spring tending to swing said support in one direction, an escapement for controlling the action of the spring, a bar connected to said support for rectilinear movement, a member arranged to reciprocate adjacent to and parallel with said bar, a part on said bar arranged to be engaged by said member, and means for disengaging said member from said part.

54. In an adding machine, a group of stops, means for setting the stops, a spring tending to cause relative movement of the group of stops on the one hand and the setting means on the other, an escapement for controlling the action of the spring, means for restoring the group of stops and the setting means to normal position, said restoring means including a bar, means for moving said bar against the tension of the spring, said bar having teeth thereon, an error key, and a dog connected to said error key and arranged to engage said teeth and thus move said bar.

55. In an adding machine, a stationary group of stops, a pivoted support, means on the said support for setting the stops, a spring tending to swing the support in one direction, an escapement for controlling the action of the spring, a bar connected to said support for rectilinear movement, means for moving said bar to swing said support against the tension of the spring, said bar having teeth thereon, an error key, and a dog connected to said error key and arranged to engage said teeth and thus move said bar.

56. In a repeat mechanism for adding machines, a part to be restored, a reciprocatory bar arranged to restore said part, said bar having a cam surface and a recess, and a stationary pin arranged to be engaged by said surface for moving said reciprocatory bar out of engagement with said part, said pin passing into said recess and holding the bar out of engagement with said part.

57. In a repeat mechanism for adding machines, a part to be restored, a reciprocatory bar arranged to restore said part, and a repeat key having a stem arranged to move said bar out of the plane of said part, said bar being free to reciprocate while out of such plane.

58. In a repeat mechanism for adding machines, a part to be restored, a reciprocatory bar arranged to engage and restore said part, said bar having a cam surface thereon, a stationary element arranged to be engaged with said surface for moving said bar out of engagement with said part upon the completion of the restoring movement, and a repeat key for keeping said bar out of engagement with said part.

59. In an adding machine, stops, stop-setting means, and means for restoring the stop-setting means, comprising a part connected to the stop-setting means, a reciprocatory member arranged to engage and restore said part, said member having a cam surface thereon, and a stationary element arranged to be engaged by said surface for moving the reciprocatory member out of engagement with said part.

60. In an adding machine, stops, stop-setting means, and means for restoring the stop-setting means to normal position comprising a bar connected to the stop-setting means for rectilinear movement, a member arranged to reciprocate adjacent to and parallel with said bar, said member being arranged to engage and restore said bar, said member having a cam surface thereon, a stationary element arranged to be engaged by said surface for moving said reciprocatory member out of engagement with said bar, and a repeat means arranged to keep said member out of engagement with said bar.

61. In an adding machine, stops, stop-setting means, and means for restoring the stop-setting means to normal position, comprising a part connected to said stop-setting means, a bell crank lever, a bar connected to one arm of said bell crank lever, said bar being arranged to engage and restore said part, means for disengaging said bar from said part, means engaging the other arm of said bell crank lever for moving said bar to restore said part, and a spring for moving said bar in the opposite direction.

62. In a repeat mechanism for adding machines, a part to be restored, a reciprocatory bar arranged to restore said part, said bar having a cam surface thereon, and a stationary element arranged to be engaged by said surface for moving said reciprocatory bar out of engagement with said part.

63. In a repeat mechanism for adding machines, a part to be restored, a reciprocatory bar arranged to restore said part, means for disengaging said bar from said part upon the completion of the restoring movement, and a repeat key having a stem arranged to hold said bar out of engagement with said part.

64. In a repeat mechanism for adding machines, a part to be restored, a reciprocatory bar arranged to engage and restore said part, said bar having a cam surface thereon, a stationary element arranged to be engaged by said surface for moving said bar out of engagement with said part upon the completion of the restoring movement, and means for keeping said bar out of engagement with said part.

65. In an adding machine, a rack, an adding pinion, means for separating the rack and the pinion, a latch for holding said separating means out of action, a member arranged to engage said latch, means for moving said member into position to engage said latch, and means for moving said member into engagement with said latch to render the latch ineffective.

66. In an adding machine, a rack, an adding pinion, means for separating the rack and the pinion, a latch for holding the said separating means out of action, a total bar supported for pivotal and sliding movement, means for pivotally moving said bar into contact with the latch, means for sliding said bar into position to engage the latch, and means for sliding said bar in the opposite direction into engagement with the latch to render the latch ineffective.

67. In an adding machine, a rack, an adding pinion, means for separating the rack and the pinion, a latch for holding said separating means out of action, a total bar mounted for pivotal and sliding movement, a stud on the latch, said total bar having a shoulder arranged to engage the stud, means for tilting the bar into contact with the stud, means for sliding the bar to place the shoulder in line with the stud, and means for sliding the bar to carry the shoulder against the stud and thus move the latch.

68. In an adding machine, a rack, an adding pinion, means for separating the rack and the pinion, a latch for holding said separating means out of action, a total bar mounted for pivotal and sliding movement, a stud on the latch, said total bar having a shoulder arranged to engage the stud, a total key for pivotally moving the total bar into contact with the stud, means for sliding said bar to place the shoulder in line with the stud, and means for sliding the bar in the opposite direction to move the shoulder against the stud and thus move the latch.

69. In an adding machine, a rack, an adding pinion, means for separating the rack and the pinion, a latch for holding said separating means out of action, a total bar mounted for pivotal and sliding movement, a stud on the latch, said total bar having a shoulder arranged to engage the stud, means for pivotally moving the total bar into contact with the stud, a main actuating handle, an arm arranged to move with said handle, said arm being arranged to slide said total bar to place the shoulder in line with the stud, and means for sliding the total bar in the opposite direction to carry the shoulder against the stud.

70. In an adding machine, a rack, an adding pinion, means for separating the rack and the pinion, a latch for holding said separating means out of action, a total bar mounted for pivotal and sliding movement, said latch having a stud arranged to be engaged by the shoulder on said bar, means for pivotally moving said bar against the stud, means for sliding the bar to place the shoulder in line with the stud and a spring for sliding the bar in the opposite direction to carry the shoulder against the stud and thus render the latch ineffective.

71. In an adding machine, a rack, an adding pinion, means for separating the rack and the pinion, a latch for holding said separating means out of action, a substantially horizontal total bar having a longitudinal slot therein, a pivot extending through said slot, a stud on the latch arranged to be engaged by the shoulder on the total bar, means for tilting said bar to place the latter against the stud, a main actuating handle, an arm moving with said handle and arranged to engage said total bar at a point between the shoulder and the pivot for moving the total bar to place the shoulder in front of the stud, and a spring for sliding said total bar to carry the shoulder against the stud.

72. In an adding machine, a rack, an adding pinion, means for separating the rack and the pinion, a latch for holding said separating means out of action, a substantially horizontal total bar having a longitudinal slot therein, a pivot extending through said slot, a stud on the latch arranged to be engaged by the shoulder on the total bar, a total key for tilting said bar to place the latter against the stud, a main actuating handle, means for moving the total bar to place the shoulder in front of the stud, and a spring for sliding said total bar to carry the shoulder against the stud.

73. In an adding machine, a rack, an adding pinion, means for separating the rack and the pinion, a latch for holding said separating means out of action, a lever arranged to engage said latch, means for tilting said lever, means for sliding said lever into position in which it may engage the latch, and means for sliding the lever into engagement with the latch to render the latch ineffective.

74. In an adding machine, a rack, an adding pinion, means for separating the rack and the pinion, said means including a pivoted lever, an arm fixed to said lever, a latch for engaging said arm to hold the rack and pinion intermeshed, a hook pivoted to said lever, a crank-arm arranged to engage said hook and thus move said lever to intermesh the pinion and the rack, and means for disengaging the hook from said crank-arm after the pinion and the rack have been intermeshed.

75. In an adding machine, actuating racks, means for controlling the movement of the racks in the adding operation, said means including a member movable transversely of the racks, adding pinions, means tending to separate the pinions and the racks, said means including a lever, an arm rigid with said lever, a latch arranged to engage said arm and thus hold the pinions and the racks in mesh, a pivoted hook on said lever, a crank-arm arranged to engage said hook to move said lever in the direction to intermesh the pinions and the racks, and means for disengaging the hook from the crank-arm.

76. In an adding machine, actuating racks, stops for controlling the extent of movement of the racks in the adding operation, stop-setting means, adding pinions, means tending to separate the pinions and the racks, and means controlled by the stop-setting means for holding said separating means out of action.

77. In an adding machine, actuating racks, stops for controlling the extent of movement of the racks in the adding operation, stop-setting means, adding pinions, means tending to separate the pinions and the racks, a latch for holding said separating means out of action, a spring tending to move said latch into operative position, and means actuated by the stop-setting means for moving said latch out of operative position.

78. In an adding machine, actuating racks, stops for controlling the extent of the movement of the racks in the adding operation, stop-setting means, adding pinions, means tending to separate the pinions and the racks, a latch tending to hold the separating means out of action, and a frame arranged to be swung by the stop-setting means and adapted when so swung to move the latch out of operative position.

79. In an adding machine, actuating racks, means for controlling the movement of the racks in the adding operation, said means including a slide movable transversely of the racks, adding pinions, means tending to separate the pinions and the racks, a latch for holding said separating means out of action, and a part arranged to be moved by said slide, said part in turn being arranged to move said latch out of operative position.

80. In an adding machine, actuating racks, means for controlling the movement of the racks in the adding operation, said means including a member movable transversely of the racks, adding pinions, means tending to separate the pinions and the racks, a latch for holding said separating means out of action, and a frame arranged to be moved by said member, said frame having a part thereon lying in contact with said latch.

81. In an adding machine, a group of stops, a plurality of actuators each having a stop portion, means for causing relative movement between the group of stops and the plurality of stop portions, a detent member for preventing an operating movement of said stop portions, stop-setting means, and means actuated by said movement-causing means for placing said detent member in operative position.

82. In an adding machine, a group of stops, a plurality of actuators each having a stop portion, means for causing relative movement between the group of stops and the plurality of stop portions, a detent member adapted to prevent an operating movement of said stop portions, stop-setting means, and a pivoted frame connected to said detent member and arranged to be swung by said movement-causing means.

83. In an adding machine, a stationary group of stops, a plurality of actuators, each having a movable stop portion, a slide for causing relative movement between the group of stops and the plurality of stop portions, a detent member adapted to prevent an operating movement of said stop portions, stop-setting means, and a pivoted frame connected to said detent member and arranged to be swung by said slide.

84. In an adding machine, a stationary group of stops, a plurality of actuators, each having a movable stop portion, said stop portions normally being located at one side of the group of stops, a detent member at said side of the group of stops, stop-setting means, means for causing synchronous movement of the stop-setting means and the plurality of stop portions relatively to the group of stops, a part arranged to be moved in such synchronous movement, and a connection between said part and said detent member.

85. In an adding machine, a main rock shaft, a crank-arm fixed on said shaft, an actuating shaft pivotally mounted on said shaft, a yielding connection between the handle and the crank-arm, operating mechanism connected to the crank-arm, and means operated by said mechanism for controlling the movement of said handle in one direction.

86. In an adding machine, a rock shaft, a crank-arm fixed on said shaft, an actuating handle, a yieldable connection between the crank-arm and the handle, a spring tending to swing the handle in one direction, mechanism connected to the crank-arm, and a detent controlled by the mechanism for controlling the movement of the handle under the action of the spring.

87. In an adding machine, a rock shaft, a crank-arm fixed on said shaft, an actuating handle, a spring tending to swing the handle in one direction, a yieldable connection between the crank-arm and the handle, a part arranged to be moved by the crank-arm, a lever arranged to be moved by said part, and a detent on said lever for controlling the movement of the handle under the action of the spring.

88. In an adding machine, a main rock shaft, a crank-arm fixed on said shaft, an actuating handle pivotally mounted on said shaft, a spring tending to swing the handle in one direction, a yieldable connection between the crank-arm and the handle, a part arranged to be moved by the crank-arm, a cam lever arranged to be moved by said part, and a spring-held detent on said lever for controlling the movement of the handle under the action of the spring.

89. In an adding machine, a main rock shaft, an actuating member on said shaft, stop-setting means, and a member arranged to lock the stop-setting means, said member being operated by said actuating member.

90. In an adding machine, a rock shaft, an actuating member on said shaft, stop-setting means, and a pivoted lever, one end of which is arranged to lock the stop-setting means, said actuating member being arranged to engage the other end of said lever to move said lever into locking position.

91. In a two-color mechanism for adding machines, the combination of a ribbon carrier, means for moving the ribbon carrier, a yieldable connection between the ribbon carrier and the moving means, stop-setting means, and means actuated by the stop-setting means for holding the ribbon carrier against movement.

92. In a two-color mechanism for adding machines, a ribbon carrier, means tending to move said ribbon carrier, a member for locking the ribbon carrier against movement, stop-setting means, and a part arranged to have a step-by-step movement as the stop-setting means is actuated, said part being arranged to actuate the locking member.

93. In an adding machine, a plurality of key-actuated levers, a locking member movable into and out of position to obstruct movement of the levers, and a key for operating said member.

94. In an adding machine, a plurality of key-actuated levers arranged side by side, a locking member movable into and out of position alongside said levers, said member extending transversely of the levers, and means for operating said member.

95. In an adding machine, a rack, an adding pinion, means for separating the rack and the pinion, said means including a pivoted lever, a hook pivoted to said lever, a crank arm arranged to engage said hook to intermesh the pinion and the rack, and key-actuated means for pivotally moving said hook out of the range of action of said crank-arm.

96. In an adding machine, a rack, an adding pinion, means for separating the rack and the pinion, said means including a pivoted lever, a hook pivoted to said lever, a member arranged to engage said hook and thus move said lever to intermesh the pinion and the rack, and means for pivotally moving said hook out of the range of action of said member.

97. In an adding machine, a rack, an adding pinion, means for separating the rack and the pinion, said means including a pivoted lever, an arm fixed to said lever, a latch for engaging said arm to hold the rack and pinion intermeshed, a hook pivoted to said lever, a crank arm arranged to engage said hook and thus move said lever to intermesh the pinion and the rack, a lever pivoted intermediate its ends, one end of the last mentioned lever being arranged to engage said hook, and a non-add key arranged to engage the other end of the last mentioned lever to move said lever to remove the hook from the range of action of the crank-arm.

98. In an adding machine, a rack, an adding pinion, means for separating the rack and the pinion, said means including the pivoted lever, an arm fixed to said lever, a latch for engaging said arm to hold the rack and pinion intermeshed, a hook pivoted to said lever, a crank-arm arranged to engage said hook and thus move said lever to intermesh the pinion and the rack, and a second latch arranged to engage said arm to hold the rack and pinion intermeshed, said crank arm being arranged to engage said arm and disengage the second latch from said arm.

99. In an adding machine, actuating racks, means for controlling the movement of the racks in the adding operation, said means including a member movable transversely of the racks, adding pinions, means tending to separate the pinions and the racks, said separating means including a lever, an arm rigid with said lever, a latch arranged to engage said arm and thus hold the pinions and the racks in mesh, said member being adapted to hold the latch out of operation, a pivoted hook on said lever, a crank-arm arranged to engage said hook to move said lever in the direction to intermesh the pinions and the racks, means for disengaging the hook from the crank-arm after the pinions and the racks have been intermeshed, said crank-arm being arranged to engage said arm, and a second latch arranged to engage said arm to hold the racks and the pinions intermeshed, said crank-arm being arranged to move said second latch out of operative position.

In testimony whereof, I hereunto set my hand in the presence of two witnesses.

GUSTAF DAVID SUNDSTRAND.

In the presence of—
C. K. WELSH,
MABEL E. YOUNGQUIST.